United States Patent [19]

Ching et al.

[11] 4,002,841
[45] Jan. 11, 1977

[54] DATA COMPRESSION USING NEARLY INSTANTANEOUS COMPANDING IN A DIGITAL SPEECH INTERPOLATION SYSTEM

[75] Inventors: Yau-Chau Ching, Morganville; Allan Michael Hofmann, Jackson; David Gavin Messerschmitt, Middletown, all of N.J.

[73] Assignee: Bell Telephone Laboratories, Incorporated, Murray Hill, N.J.

[22] Filed: Jan. 21, 1976

[21] Appl. No.: 650,936

[52] U.S. Cl. .................. 179/15 AS; 179/15 BW
[51] Int. Cl.² ............................................. H04J 6/02
[58] Field of Search ... 179/15 BW, 15 AS, 15.55 R, 179/15 AV; 178/DIG. 3

[56] References Cited

UNITED STATES PATENTS

| | | | |
|---|---|---|---|
| 3,811,014 | 5/1974 | Seitz | 179/15 BW |
| 3,927,268 | 12/1975 | Sciulli | 179/15 BW |
| 3,945,002 | 3/1976 | Duttweiler | 179/15 AV X |

OTHER PUBLICATIONS

Alta Frequenza, vol. XLIII, No. 9, Sept. 1974; "Use of Digital Speech Interpolation..." by Poretti et al.

IEEE Transactions on Communications, Sept. 1974, "Speech Interpolation..." by Lyghounis et al.

Primary Examiner—David L. Stewart
Attorney, Agent, or Firm—Richard J. Roddy

[57] ABSTRACT

A digital speech interpolation (DSI) system advantageously utilizes speech inactivity time to reduce the bit rate by compressing digital characters from a plurality of trunks onto a lesser plurality of channels. A signaling arrangement is typically employed therein to signal a receiver as to the activity of a trunk. If the number of active trunks exceeds the number of channels, an overload may exist. Known arrangements for mitigating overload typically include apparatus responsive to an activity signal for truncating one or more bits from the digital characters and for transmitting the truncated characters. Unfortunately, quantization noise is increased and digital precision decreased in such arrangements. The hereindisclosed system includes an improved automatically adaptive arrangement for advantageously incorporating nearly instantaneous companding (NIC) and priority trunk rotation in a plurality of frames, called a multiframe. Thereby, a mitigation of overload as well as a lessening of quantization noise relative to known DSI arrangements is attained.

12 Claims, 21 Drawing Figures

| MAXIMUM SEGMENT VALUE LESS CHARACTER SEGMENT VALUE | CHARACTER SEGMENT VALUE ABC | |
|---|---|---|
| | ABC≠0 | ABC=0 |
| 0 | SIWXYZ000000 | SWXYZ0000000 |
| 1 | S0IWXYZ00000 | S0WXYZ000000 |
| 2 | S00IWXYZ0000 | S00WXYZ00000 |
| 3 | S000IWXYZ000 | S000WXYZ0000 |
| 4 | S0000IWXYZ00 | S0000WXYZ000 |
| 5 | S00000IWXYZ0 | S00000WXYZ00 |
| 6 | S000000IWXYZ | S000000WXYZ0 |
| 7 | — | S0000000WXYZ |

| NAND GATE INPUTS | | | | | | NEW ASV SIGNAL, GATE 730 OUTPUT |
|---|---|---|---|---|---|---|
| GATE 710 | | GATE 720 | | GATE 730 | | |
| LEAD 131 | UD | U̅D̅ | OLD ASV SIGNAL | GATE 710 OUTPUT | GATE 720 OUTPUT | |
| 1 | 0 | 1 | 0 | 1 | 1 | 0 |
| 0 | 0 | 1 | 0 | 1 | 1 | 0 |
| 1 | 0 | 1 | 1 | 1 | 0 | 1 |
| 0 | 0 | 1 | 1 | 1 | 0 | 1 |
| 1 | 1 | 0 | 0 | 0 | 1 | 1 |
| 0 | 1 | 0 | 0 | 1 | 1 | 0 |
| 1 | 1 | 0 | 1 | 0 | 1 | 1 |
| 0 | 1 | 0 | 1 | 1 | 1 | 0 |

FIG. 3A
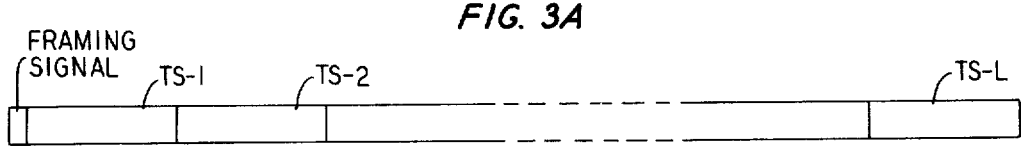
FIG. 3B
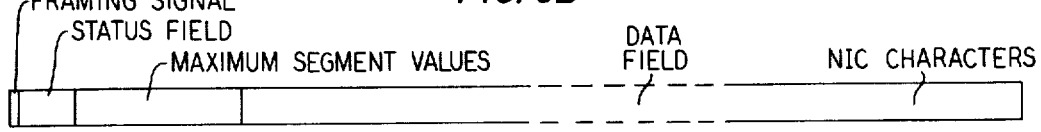
FIG. 3C
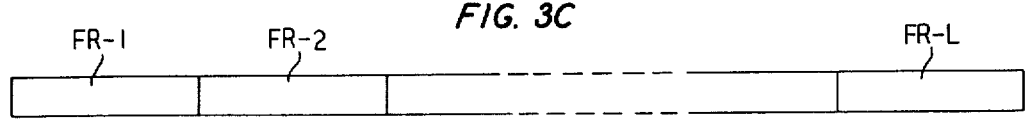
FIG. 3D
| FRAME NO. | TRUNK ACTIVITY STATUS | MAXIMUM SEGMENT FIELD | | |
|---|---|---|---|---|
| 1 | 1 - 8 | 1-8 | 65-72 | 129-136 |
| 2 | 9-16 | 9-16 | 73-80 | 137-144 |
| 3 | 17-24 | 17-24 | 81-88 | 145-152 |
| 4 | 25-32 | 25-32 | 89-96 | 153-160 |
| 5 | 33-40 | 33-40 | 97-104 | 161-168 |
| 6 | 41-48 | 41-48 | 105-112 | 169-176 |
| 7 | 49-56 | 49-56 | 113-120 | 177-184 |
| 8 | 57-64 | 57-64 | 121-128 | 185-192 |
| 9 | 65-72 | 1-8 | 65-72 | 129-136 |
| 10 | 73-80 | 9-16 | 73-80 | 137-144 |
| 11 | 81-88 | 17-24 | 81-88 | 145-152 |
| 12 | 89-96 | 25-32 | 89-96 | 153-160 |
| 13 | 97-104 | 33-40 | 97-104 | 161-168 |
| 14 | 105-112 | 41-48 | 105-112 | 169-176 |
| 15 | 113-120 | 49-56 | 113-120 | 177-184 |
| 16 | 121-128 | 57-64 | 121-128 | 185-192 |
| 17 | 129-136 | 1-8 | 65-72 | 129-136 |
| 18 | 137-144 | 9-16 | 73-80 | 137-144 |
| 19 | 145-152 | 17-24 | 81-88 | 145-152 |
| 20 | 153-160 | 25-32 | 89-96 | 153-160 |
| 21 | 161-168 | 33-40 | 97-104 | 161-168 |
| 22 | 169-176 | 41-48 | 105-112 | 169-176 |
| 23 | 177-184 | 49-56 | 113-120 | 177-184 |
| 24 | 185-192 | 57-64 | 121-128 | 185-192 |

DATA COMPRESSION USING NEARLY INSTANTANEOUS COMPANDING IN A DIGITAL SPEECH INTERPOLATION SYSTEM

BACKGROUND OF THE INVENTION

This invention relates to a digital communication system and, more particularly, to a digital communications system for processing digital characters to mitigate overload.

In a pulse code modulation (PCM) system, a typical analog-to-digital transmitter encoder functions to quantize an analog message sample and to generate a digital character. In nonuniform PCM encoding, for example, encoding according to a $\mu = 255$ companding law such as is utilized in the T-Carrier System of the Bell System, each analog sample is converted into an eight-bit digital character. The initial bit of the digital character represents the sign or polarity of the analog sample and is hereinafter labeled S. The coarse amplitude of the analog sample is represented by the three bits following the sign bit and is labeled ABC hereafter. Each combination of the ABC bits, known as a segment value, represents one of eight amplitude ranges. The value of consecutive segments corresponds to a doubling in magnitude of the analog sample. Finally, the remaining four bits, called the mantissa bits and here labeled WXYZ, represent one of sixteen usually equal length intervals present in each of the segments. Once generated, each digital character "SABCWXYZ" is transmitted over a communication link to a receiver. For example, in the Bell System T-Carrier System, a character is multiplexed into a time slot of a 193-bit frame and the frame then transmitted at a nominal bit rate of 1.544 megabits per second (Mb/s) over a digital communication link to the receiver. The frame usually includes a framing signal and a plurality of characters, each character from a different one of a plurality of input trunks, typically 24 trunks. At the receiver, the frame is advantageously demultiplexed so that each character can be extended to a respective output trunk.

In a large telecommunication system, it is economically desirable to efficiently utilize the communication link as, for example, by reducing bandwidth. As a result, various transmitter bandwidth reduction arrangements exist in the prior art for compressing a large number of trunks, e.g., N trunks, onto a communication link having a smaller number of channels, e.g., C channels, (C<N), with a typical compression ration N/C of about three-to-one. Of course, the receiver usually includes an inverse arrangement for expanding each channel to the respective trunk. On the one hand, no actual bandwidth reduction is obtained if the number of trunks having active speech as detected by a speed detector does not exceed the number of channels, since each active trunk is then assignable to a channel. On the other hand, if the number of active trunks, labeled $N_A$, exceeds the number of channels, the exceeding being called an overload, a substantial loss of information may obtain. As one would expect, the loss gives use to a signal degradation.

Overload and its unfortuitous effects can be mitigated in a digital speech interpolation (DSI) system by increasing the effective number of channels provided on the link. Of course, as the effective number of channels becomes equal to the number of active trunks, $N_A$, overload is obviated. However, its unfortuitous effects including insertion of additional quantization noise in the active speech signal usually remain. In known DSI systems an increase in the effective number of channels is often achieved using apparatus for partitioning a fixed-length PCM output frame into a data field of D bits and an activity status field of A bits.

Within the data field, digital characters are advantageously formatted so that, for an eight-bit character, a typical data field bit length is eight times the number of channels, i.e., $D = 8C$ bits. It is clear, therefore, that, in a fixed length data field, the effective number of channels on the link can be increased by reducing the number of bits employed to encode the analog sample. For example, by compressing each digital character from eight bits to six bits per character, the number of effective channels increases from D/8 to D/6 channels, an increase in excess of 33 percent. Hence, bandwidth is reduced and overload is mitigated.

In one compression arrangement having a character from each active trunk, it is common that each character in the data field of length D bits be compressed so that all $N_A$ compressed characters have the same number of bits, e.g., $Q = D/N_A$ bits per character. Illustratively, for $Q = 6$ the character "SABCWXYZ" could be compressed to "SABCWX" with the least significant "YZ" bits being truncated. However, inasmuch as $D/N_A$ may not be an integer, that arrangement often results in unused bits in the data field. In another compression arrangement, the compressed characters in the data field differ by at most one bit, i.e., the length of some characters is Q bits while that of others is (Q + 1) bits. Although in the second arrangement all bits in the data field can be used, both compression arrangements increase quantization noise. Also, both arrangements typically employ an arithmetic unit to precalculate the number of bits per compressed character. However, as between the two, the second typically results in less quantization noise than the first and, accordingly, has theretofore been a preferable arrangement for mitigating overload and its unfortuitous effects.

Of course, signaling arrangements are employed between transmitter and receiver for the former to notify the latter of a correspondence between trunk and channel. Such is a function of the aforementioned activity status field. In the status field, there are usually one or more bits assigned to each trunk. For example, in a status field having one bit allocated to each trunk, i.e., $A = N$, a logic one in bit $i$ could mean that trunk number $i$ is active; whereas a logic zero could means the trunk is inactive. Thus the number of logic ones in the status field could equal the number of active trunks on the communications link. It is known that still further mitigation of overload is possible by efficiently processing the activity bits. For example, if the activity field in each frame is arranged to signal the activity of a lesser number than N trunks, the length of the data field can be increased. In particular, if the frame bit length remains a constant, it is clear that, as the number of bits allocated in the partitioning to the status field is decreased, the bit length of the data field can be increased. Further, as the length of the data field D is increased and the number of bits per digital character Q remains constant, or even decreases, the effective number of channels D/Q can be increased. Hence, overload can be further mitigated. Exemplary thereof is one known arrangement where the bit rate is reduced by signaling the activity status once each multiframe where a multiframe includes a plurality of frames.

Thus, by signaling the activity status of each trunk only once during, for example, 24 frames, rather than transmitting the status bits for all trunks during each of the 24 frames, still further bandwidth reduction is obtained. Notwithstanding, known DSI arrangements for mitigating overload by data compression typically introduce excessive quantization noise.

Accordingly, a broad object of our invention is to provide an improved digital communications system for mitigating overload and its unfortuitous effects.

SUMMARY OF THE INVENTION

This and other objects of our invention are achieved in an improved digital communication system for communicating digitized message samples between a transmitting station and a receiving station over a first plurality of trunks through a second plurality of channels. In one aspect of the invention, an improved nearly instantaneous companding (NIC) converter is included for conserving bandwidth and attaining a structured control of signal degradation as the number of active trunks increases to otherwise effectuate an overload. According to another aspect of our invention, NIC encoded digital characters are incorporated in each frame of a multiframe. A still further aspect of our invention includes an automatically adaptive arrangement wherein bits of a first NIC encoded character are advantageously interleaved with bits of a second NIC character so that all bits of the data field in each frame may be used. Upon detection of an increase in the number of active trunks, our automatically adaptive arrangement efficaciously adapts thereto and may employ fewer bits in each NIC character to mitigate overload, while at the same time achieving a structured control of signal degradation during overload.

BRIEF DESCRIPTION OF THE DRAWING

FIG. 3A illustrates a typical input frame provided to the transmitter of FIG. 1 and used herein to explain the operation thereof;

FIG. 3B illustrates a frame within the output multiframe of FIG. 3C;

FIG. 3C illustrates an output multiframe provided by the transmitter of FIG. 1 in response to an input frame of the type shown in FIG. 3A;

FIG. 3D illustrates an assignment of activity status and data field to each output frame (FIG. 3B) included in an output multiframe (FIG. 3C);

DETAILED DESCRIPTION

Figure 1:
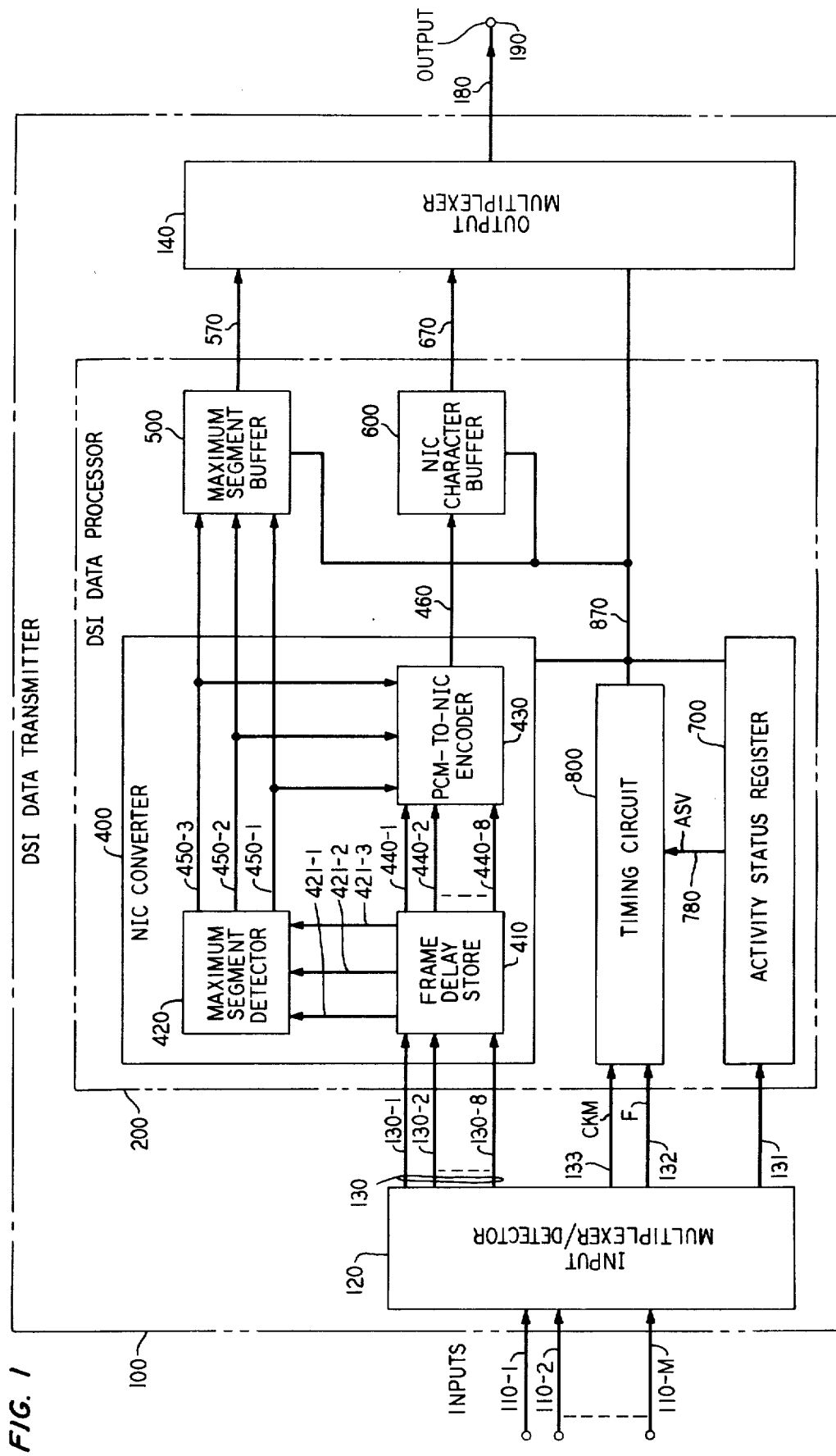
FIG. 1 is a schematic block diagram illustrative embodiment of a data transmitter in accordance with the principles of the invention.

An illustrative embodiment of a digital speech interpolation (DSI) data transmitter in accord with the principles of our invention is shown in the block diagram schematic of FIG. 1. While described for purposes of brevity herein in terms of a transmitter, it is clear that the principles of our invention apply also to an improved DSI data receiver. Broadly, one of a plurality of multibit input frames is provided to a respective one of a plurality of input terminals 110-1 through 110-M of data transmitter 100 and is extended therein through input multiplexer/detector circuit 120 to data bus 130. Each time slot of the input frame includes a multibit digital character from a respective trunk. For ease of assimilation, each input digital character is assumed to be an eight bit PCM character. The PCM characters are extended one after another in parallel format over data bus leads 130-1 through 130-8 to NIC converter 400 of DSI data processor 200. Concurrent with the PCM character transfer, a trunk activity signal is extended over lead 131 to activity status register 700 of DSI processor 200 for indicating and storing the activity status of the trunk from which the character appearing on data bus 130 was obtained. The data thus extended to DSI processor 200 are advantageously processed thereby in accord with the principles of our invention to form an improved multiframe. The improved multiframe is thereafter extended through output multiplexer 140, then over lead 180 to output terminal 190 for transmission to a receiver.

The processing through DSI processor 200 includes each PCM character from a trunk being operated upon by NIC converter 400 so as to obtain a nearly instantaneous companded character for transmission to the receiver.

As background to a description of converter 400, copending application D. L. Duttweiler-D. G. Messerschmitt, Ser. No. 517,879, filed Oct. 25, 1974 and now U.S. Pat. No. 3,945,002 issued Mar. 16, 1976 discloses a digital block processor for conserving bandwidth by reducing bit rate. The bit rate reduction is accomplished by compression of a predetermined number of nonuniformly encoded PCM digital characters, called a PCM block. The PCM block is stored in a digital delay store during the time that the maximum segment value present in the block is determined. The illustrative three-bit maximum value is then transmitted to the receiving station. Thereafter, character-by-character, each PCM character in the block is advantageously coded to produce a character having fewer bits, called Nearly Instantaneous Companded (NIC) digital character. The plurality of NIC characters is called a NIC block. Each illustrative NIC character in a NIC block consists of six bits. The initial bit is the same as the sign bit of the PCM character. The second bit is determined as follows: (1) If the PCM character has a segment value equal to the maximum segment value and that maximum value is not 000, the second bit of the NIC character becomes a logic one, or (2) if either the PCM character has a segment value not equal to the maximum segment value or the maximum segment value is 000, the second bit of the NIC character becomes a logic zero. The remaining four bits in the NIC character are obtained responsive to a predetermined shift operation upon the mantissa bits of the PCM character. The resultant six-bit NIC character is then transmitted to the receiving station. At the receiving station, the maximum segment value and the NIC character are utilized in "reconstructing" the PCM character. However, the reconstructed PCM is not always identical to the compressed PCM character. This lack of sameness introduces a slight signal degradation represented by approximately three decibels (dBs) of additional quantization noise over standard PCM encoding. Notwithstanding, the slight signal degradation introduced by the prior art eight-bit-to-six-bit PCM-to-NIC conversion, hereinafter labeled 8/6 NIC encoding, can be balanced against its advantageous bit rate reduction. Illustratively, an eight character PCM block typically includes 64 bits; whereas with 8/6 NIC encoding the maximum segment value and the corresponding NIC block includes 51 bits, a bit reduction in excess of 20 percent. Accordingly, even without overload, it may be economically desirable to compress the characters. Almost certainly, with overload it is desirable to employ data compression.

To mitigate overload, known apparatus, responsive to an increase in the number of active trunks, switches from an uncompressed standard PCM encoding to a compressed PCM encoding of the type exemplified by a straightforward truncation of bits of the PCM characters. The number of bits truncated is usually determined by way of arithmetic apparatus for precalculating the length of a compressed character. Thereafter the consecutive bits of each compressed character are inserted in the data field. Unfortunately, such prior art truncation of a PCM character introduces excessive quantization noise. Alternatively, the prior art teaches that NIC encoding makes available a structured control of signal degradation. Thus, it may appear advantageous to switch from standard PCM encoding to a NIC encoding responsive to the aforementioned increase in active trunks. Unfortunately, such a switching arrangement appears to be expensive and thus undesirable in a large communication system.

Figures 2, 7A, 7B:
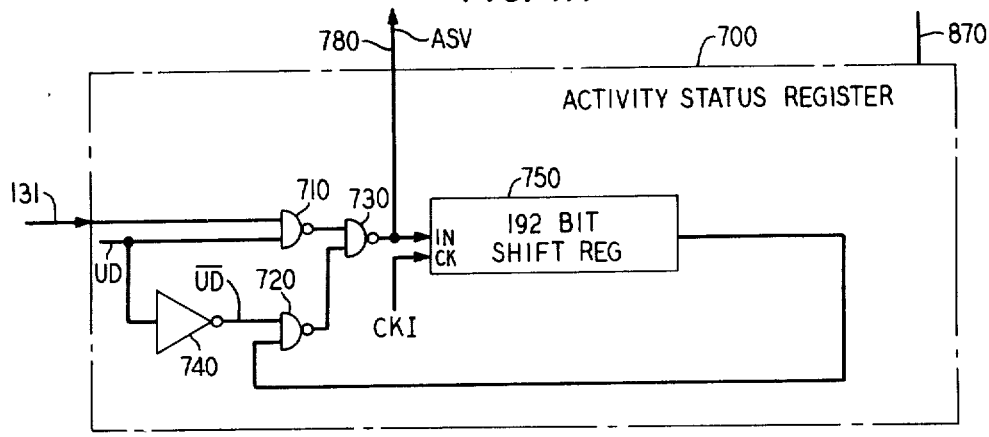
FIG. 2 illustrates a PCM-to-NIC code translation useful in explaining the operation of the transmitter in FIG. 1.
FIG. 7A illustrates an activity status register for use in the transmitter of FIG. 1.
FIG. 7B illustrates a logic truth table useful to describe the operation of the activity status register of FIG. 7A.

According to one aspect of our invention, this problem and the aforementioned prior art problems are tempered by an improved digital communications system including NIC encoding for mitigating overload and its unfortuitous effects. Specifically, this aspect of our invention treats NIC encoding as a broad encoding arrangement, the principles of which may be advantageously employed in an improved automatically adaptive DSI arrangement for mitigating overload while, at the same time, lessening signal degradation during overload. More especially, a NIC character is generated for each PCM character; however, the generated NIC character may, but need not, be a compressed counterpart of the PCM character. For example, refer to FIG. 2 where an illustrative 12-bit NIC encoding of an 8-bit PCM character is shown. For ease of description, such PCM-to-NIC encoding is hereinafter referred to as an 8/12 NIC encoding, or more generally as 8/K NIC encoding, where, in FIG. 2, K = 12. The first column of FIG. 2 shows eight rows, each row having, and being identified by, the decimal equivalent of the algebraic difference between the maximum segment value of a PCM block and the segment value of a PCM digital character in the block. On the one hand, if the PCM character segment value is not 000, i.e. ABC ≠ 0, the form of the resultant 8/12 NIC encoded character appears in the second column. Specifically, in a manner similar to prior art arrangements, each NIC character in the second column includes a number of logic zeroes inserted between the sign bit and an inserted first most significant logic one, the number of zeroes equaling the aforementioned algebraic difference, and also includes the WXYZ mantissa bits being right shifted that same number of bits. On the other hand, if the PCM character segment value is 000, i.e. ABC = 0, the corresponding 8/12 NIC encoded character is shown in the third column. Unlike the prior art arrangements, each NIC character in the third column includes the aforementioned number of logic zeroes inserted between the sign bit and the most significant mantissa bit, i.e. between bit S and bit W. Advantageously, the improved NIC encoding typified in the third column introduces less additional quantization noise than the aforementioned prior art and hence mitigates the unfortuitous effects of overload.

It should be clear at the outset that one advantage of 8/12 NIC encoding is that the PCM character thus converted is completely reconstructable at the receiver. Since it is reconstructable, the aforementioned lack of sameness with its concomitant slight signal degradation is absent. Also, with 8/12 NIC encoding, a second advantage is that there is no increase in quantization noise over standard PCM encoding. This is clear in that the sign bit, the segment value and all the mantissa bits of the PCM character are obtainable at the receiver. However, it should also be clear that these advantages are obtained at the expense of an increase in the number of bits employed to transmit each character. Notwithstanding, if the number of active trunks is small, there may be no loss of bandwidth nor increase in quantization noise. Then, as the number of active trunks increases, overload can be mitigated by automatically and adaptively truncating NIC characters in a predetermined manner. Upon bit truncation, a third advantage of this arrangement is that less additional quantization noise is introduced than is introduced with the prior art truncation of a PCM digital character. This obtains, in part, as a result of the structured control over signal degradation flowing from NIC encoding. It further obtains from the improved NIC encoding, illustrated in FIG. 2. However, some additional quantization noise may be introduced. By way of illustration, in truncating NIC characters from 12 bits to 8 bits, that is in compressing from an 8/12 NIC encoding to an 8/8 NIC encoding, there is introduced about 0.5 decibels in additional quantization noise; while in compressing from an 8/8 to an 8/6 encoding, about 2.5 decibels of additional noise are introduced. However, this small addition in noise is balanced against a substantial increase in channel capacity for mitigating overload. As still further truncation occurs, more additional quantization noise is introduced. However, advantageously, according to this first aspect of our invention, the noise is substantially less than that introduced by known prior art arrangements. Thereby, in accordance with this aspect of our invention, overload may be mitigated consistent with a graceful signal degradation and lessening of quantization noise. Hence, the unfortuitous effects of overload are also mitigated.

According to a second aspect of our invention, improved apparatus are included for mitigating overload and its unfortuitous effects by incorporating NIC encoding into a multiframe data structure. To aid in understanding this second aspect of the invention, refer to FIG. 3A which illustrates one of a plurality of typical input data frames provided to a respective one of the plurality of input terminals 110-1 through 110-M of DSI data transmitter 100 of FIG. 1. The input frame includes a framing signal and a plurality of time slots, identified as TS-1 through TS-L, each time slot having a digital character from a trunk. For example, in the T-Carrier system, there are 24 time slots in an input data frame so that $L = 24$. As a further aid in explaining this aspect of our invention, it is assumed that DSI transmitter 100 has eight input terminals, i.e., $M = 8$. Then, broadly and according to this second aspect of our invention, an input frame from each of M input terminals is advantageously processed to obtain an improved output multiframe, including data from up to $L \times M$ (=192) trunks. Specifically, FIG. 3B illustrates one of a plurality of output frames comprising the output multiframe. That illustrative output frame is assumed to be 394 bits in length and is partitioned as a framing signal field, an activity status field, and a data field.

As is well-known in the art, the framing signal field includes a multibit framing signal, illustratively herein a four-bit signal, which uniquely identifies the particular frame.

As to the status field, it will be remembered that an advantage of a multiframe relates to a reduction in the bit rate by distributing the status field over all frames in the output multiframe. Accordingly, here it is assumed that the activity status of a first predetermined group of trunks is signaled in each output frame. Although not a necessity, illustratively, let the first group include M (=8) trunks and, hence, L (=24) output frames comprise an output multiframe. Such an output multiframe is shown in FIG. 3C as including output frames FR-1 through FR-L, each output frame being of the type illustrated in FIG. 3B. To emphasize its generality, three bits rather than one bit are assumed to be allocated to signal the activity status of each of the M trunks. Hence, the length of the illustrative status field in an output frame is 24 bits, leaving 366 bits in each output frame for the data field.

As to the latter, the data field is further partitioned to include maximum segment values for a second predetermined group of L (=24) trunks as well as a NIC character for each of up to $L \times M$ (=192) active trunks. Hence it should be clear that while a maximum segment value for an active trunk if transmitted in a first frame, the eight NIC characters comprising the NIC block are transmitted in respective frames, e.g., in eight contiguous frames. Thus it should also be clear that a change in the activity status of a trunk should not be signaled to the receiver at least until the NIC block has been transmitted. An arrangement to obviate a potential activity signal discrepancy is described later in relation to a priority rotation. Continuing as to the data field, for the present description, the first group of M trunks is assumed to be a subset of the second group of L trunks. Also, the data field partitioning is arranged so that all maximum segment values are transmitted before any NIC character is transmittted. By way of example, assume about 40 percent of the trunks are active, say 80 out of 192 trunks are active. Stemming therefrom, let ten out of the second predetermined group of L (=24) trunks be active. Thusly, 30 bits are used to transmit the ten three-bit maximum segment values. Therefore, in the illustrative output frame 336 bits (i.e., 366 — 30) would remain available for transmitting NIC encoded characters for each of the 80 active trunks. Using truncation data compression upon the NIC characters to mitigate overload would allow each NIC character in the frame to be compressed from eight bits to an average of about 4.2 bits per character. Advantageously, according to this aspect of our invention, the additional quantization noise introduced by truncation of NIC encoded characters is substantially less than that introduced by a prior art straightforward truncation of PCM characters in a frame of similar size. For example, a PCM character of the form "SABCWXYZ" is in the prior art truncated so that the characters which are transmitted to the receiver are of the form "SABC" "SABCW." Clearly, at most the character sign bit, segment value, and a mantissa bit are transmitted in the prior art. On the other hand, in accordance with this aspect of our invention, the maximum segment value for each NIC block is transmitted. In addition thereto, a truncated NIC character is transmitted. Assuming in FIG. 2 a zero difference between maximum segment value and character segment value, the truncated NIC character would be of the form "SIWX" or "SIWXY." Therefore, on reconstruction at the receiver, the improved reconstructed digital character would be of the form "SABCWXOO" or "SABCWXYO." Unfortunately, in the prior art, a reconstructed character of the form "SABCOOOO" or "SABCWOOO" is obtained. Efficaciously, applying the principles of our invention introduces substantially less additional quantization noise than does the prior art.

According to a third aspect of our invention, all bits in the data field may be used. Specifically, in addition to the maximum segment value for each active trunk in the second predetermined group of L trunks, each bit of each NIC character from each of up to $L \times M$ active trunks in each frame of each output multiframe may be transmitted to the receiver in a predetermined order. As previously mentioned, the prior art suffers from the need for an arithmetic unit to precalculate the number of bits per compressed character. According to this aspect of our invention, such precalculation is obviated. Our predetermined order of transmission is automatically adaptive to the number of active trunks. Specifically, that predetermined order may be obtained by interleaving bits of different ones of the NIC characters. Illustratively, that order is as follows. The first bit of a NIC character from a first predetermined active trunk is transmitted. That bit is followed by the first bit of a character from a second predetermined active trunk. In turn, that bit is followed by the first bit of a character from a third predetermined trunk. The process continues until either the first bit of the characters from each and every active trunk is transmitted, or all bits in the data field are used. It will be remembered that the first bit is the sign bit of the NIC character. Following thereafter, the second bit of the character from each and every active trunk is transmitted in the same predetermined order as the first bits. The process continues for the third, fourth, et cetera bits of the NIC characters from each active trunk until either all bits of the characters from the active trunks have been transmitted, or all bits in the data field are used.

To more acutely illustrate these aspects and to indicate how each NIC encoded character from an active trunk may be compressed using our illustrative automatically adaptive DSI arrangement, the following numerical example is presented. Assume, as before, about 40 percent trunk activity so that ten out of the second predetermined group of L (=24) trunks in a frame are active. Therefore, 30 bits out of the 366-bit data field are used to transmit the maximum segment values. Then 80 bits out of the remaining 336 bits of the data field, 30 bits having been used for maximum segment values, are employed to transmit the first bit of a NIC character from each of the 80 active trunks. There are, therefore, 256 unused bits (i.e. 336 − 80) in the data field available for transmission of the remaining bits in the NIC characters. Following thereafter, the second, third, and fourth bits of the NIC characters are transmitted in the described predetermined order. Following the transmission of the first four bits, 320 out of 336 bits have been used, leaving only 16 bits unused in the data field. Clearly, not all fifth bits can then be transmitted. Rather, employing the described predetermined order until all bits in the data field have been used, the fifth bit of the NIC character for each of 16 prefixed active trunks are transmitted. The 16 prefixed active trunks are determined according to a priority rotation arrangement discussed in detail below.

Having defined the predetermined order in which the bits are transmitted, it remains to define the first predetermined active trunk from which is transmitted a NIC character in a frame. It is clear from the aforedescription that during overload characters from the active trunks may not be transmitted to the receiver as equal length characters. As has been pointed out, characters from the active trunks may differ by at most one bit so that all bits in the data field are used. It should be evident that the more bits transmitted per character, the less the additional quantization noise. Accordingly, the first predetermined active trunk should not be the same trunk each frame since to do so would typically allow for transmission of more bits per character for digitized samples on that trunk. As a result, the signal quality among trunks in the frame could be significantly different. Advantageously, using a priority rotation arrangement according to this aspect of our invention, the signal quality difference may be averaged so that the signal degradation for all active trunks is approximately uniform. However, in obtaining a priority rotation arrangement, care must be taken to avoid transmitting a character from a trunk before the receiver is signaled that the trunk is active. Therefore, according to this aspect of our invention, an improved priority rotation arrangement is provided to advantageously average the signal degradation among the active trunks as well as to obviate the aforementioned potential discrepancy in the activity status of a trunk.

Referring to FIG. 3D, there is illustrated an assignment of trunks to frames. Specifically, the first column labeled "Frame No." identifies in rows 1 through L (=24) the plurality of frames comprising the output multiframe illustrated in FIG. 3C. The second column labeled "Trunk Activity Status" indicates the aforementioned first predetermined group of M (=8) trunks, the activity status of each of which is signaled in the frame identified in column one. The third column of FIG. 3D labeled "Maximum Segment Field" illustrates in each of its rows the aforementioned second predetermined group of L (=24) trunks. A maximum segment value from each active trunk in the second group would be inserted in the data field of FIG. 3B for the frame identified in the second column. On the one hand, it should be noted that the activity of each trunk is advantageously signaled only once during a multiframe. By way of example, the activity of trunk 26 is signaled in only frame 4. On the other hand, a maximum segment value from an active trunk may be transmitted three times in a multiframe, e.g., a maximum segment value from trunk 26 may be transmitted in frames 4, 12 and 20. However, the activity status may change between different frames of the output multiframe. Therein lies the source of the signal quality difference problem mitigated by our priority rotation arrangement.

As to averaging the signal degradation over all active trunks, one numerical example of our priority rotation is presented by way of illustration. From the second column of FIG. 3D, frame number 4 includes activity status signals for trunks 25–32, the first predetermined group of M (=8) trunks. The data field in frame 4 may include maximum segment values from trunks 25–32, 89–96, and 153–160, the second predetermined group of L (=24) trunks, as well as a NIC character from each of up to 192 active trunks. To average the degradation, the first predetermined active trunk from which a NIC character is transmitted is trunk 25, if active, the second predetermined active trunk is trunk 26, if active, et cetera, through trunk 192, if active. Then a "wraparound" occurs so that NIC characters are transmitted in the interleaved manner respectively for trunks 1–24, if active. Such defines the predetermined order of active trunks for one frame in the output multiframe. To average the degradation over all trunks for mitigating the signal quality difference, the predetermined order is different in each frame in which a NIC character for the same active trunk is transmitted. For example, in frame 12 where the activity status of trunks 89–96 is signaled in the status field, the data field is rotated vis-a-vis frame 4. Specifically, the first predetermined trunk is trunk 89, if active; the second, trunk 90; et cetera through trunk 192. Thereafter, the "wraparound" so that the next predetermined trunk is trunk one through trunk 88.

Thus in summary of the illustrated arrangement, the first predetermined group of M (=8) trunks is a mathematical subset of the second predetermined group of L (=24) trunks. A change in activity status of a trunk is signaled in a frame only if that trunk is included in the first predetermined group of M trunks, illustrated in the second column of FIG. 3D, associated with the frame. Further, a maximum segment value is transmitted in a frame for each active trunk included in the second predetermined group of L trunks, illustrated in the third column of FIG. 3D. Still further, a NIC character is transmitted from each active trunk in each frame of the output multiframe. So much for a broad illustrative description.

As to a description of a specific illustrative embodiment of our improved overload mitigation arrangement, an input frame as in FIG. 3A is provided to each of input terminals 110-1 through 110-M in FIG. 1 and extended therefrom through input multiplexer/detector 120 for processing by DSI data processor 200 to provide an output multiframe as in FIG. 3C through output multiplexer 140 over lead 180 to output terminal 190 for transmission to the receiver. Illustratively, assume eight input terminals, i.e., M = 8, an input frame being provided to each terminal at a nominal bit rate of 1.544 Mb/s. Also assume the output multiframe is provided to terminal 190 at a nominal bit rate of about 3.152 Mb/s. Such a DSI data transmitter would obtain a bit rate reduction of about 3.9-to-one together with a substantial reduction in bandwidth requirements. As to overload, consider the previously described 394-bit frame including a 366-bit data field for transmitting a three bit maximum segment value for each active trunk in the second predetermined group of L (=24) trunks as well as a 12-bit NIC character from each active trunk. There overload would not occur until the number of active trunks $N_A$ exceeds 24, i.e., when $N_A > 366/(3+12)$, which corresponds to a designed trunk-to-channel compression ratio of about eight-to-one, or an activity of about 12.5 percent. Thereby an improved DSI data transmitter in accord with the principles of our invention attains a substantial bit rate reduction as well as a substantial trunk-to-channel compression. However, the transmitter, as previously mentioned, would be subject to the unfortunate woes of overload, here as the number of active trunks increased beyond 24.

As an aid in describing illustrative apparatus for mitigating overload and its deleterious effects as well as for ease of exposition, assume the plurality of input frames are synchronized with respect to each other. Thus, since each 193-bit input frame is assumed to arrive at a nominal bit rate of 1.544 Mb/s, the time for processing all M input frames is about 125 microseconds. Further, to show the general applicability of the principles of our invention illustrative 8/8 NIC encoding apparatus rather than apparatus for the heretofore discussed 8/12 NIC encoding is described. It will be recalled that an 8/8 NIC character is the 8/12 NIC character of FIG. 2 with its four least significant bits truncated.

Multiplexer/detector 120 is a straightforward adaptation of a processor known in the art as a di-group terminal. Specifically, multiplexer 120 provides a plurality of signals to DSI processor 200 as well as derives a second plurality of signals for internal use including a timing signal derived from an input frame. For a T-Carrier System, the derived timing signal is about 1.544 MHz. Further, as is well known, multiplexer 120 includes apparatus for detecting framing from an incoming frame and extending a framing signal F corresponding thereto over lead 132 to timing circuit 800. Multiplexer 120 also provides a master clock signal, labeled CKM, over lead 133 to timing circuit 800 at a nominal pulse rate of 12.608 MHz, or four times the aforementioned output bit rate. Various clock signals including the frame and master clock signals are illustrated in FIG. 8B. Still further, multiplexer/detector 120 typically includes a standard speech detector for detecting and extending a trunk activity signal over lead 131 to activity status register 600. The trunk activity signal indicates whether a particular trunk is active or inactive. Illustratively, the trunk signal is a logic one if the trunk is active and a logic zero, if inactive. Concurrently with extending a trunk activity signal, multiplexer 120 extends a PCM character from the particular trunk, in parallel format, over data bus leads 130-1 through 130-8.

Broadly, DSI data processor 200 includes apparatus responsive to the signals from multiplexer 120 for performing three functions. First, NIC converter 400 includes apparatus for 8/8 NIC encoding of PCM characters, which are extended thereto over data bus leads 130-1 through 130-8. Second, a buffering function and priority rotation function are provided by maximum segment buffer 500 and NIC character buffer 600. Third, activity status update and timing clock signals used throughout processor 200 are provided respectively by activity status register 700 and timing circuit 800. The clock signals, illustrated in relative clock timing diagram FIG. 8B and, in part, provided by the illustrative circuit shown in FIG 8A, will be described later.

Figure 4A:
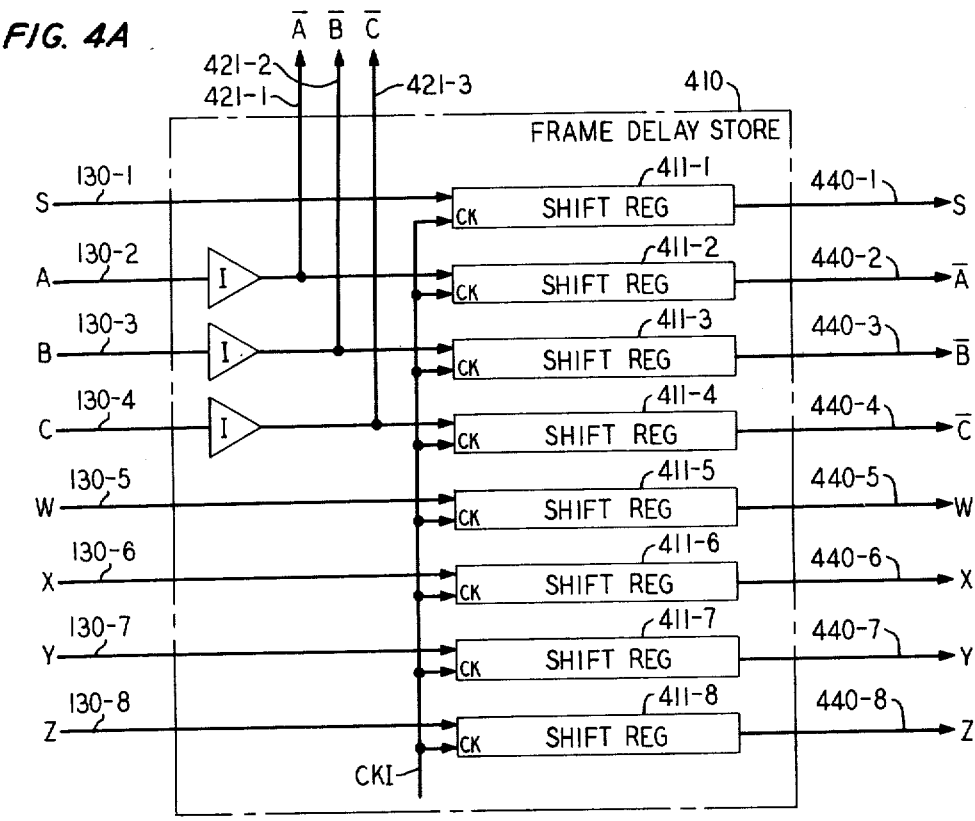
FIGS. 4A, 4B, 4C illustrate respectively a frame delay store, a maximum segment detector, and a PCM-to-NIC encoder for use in the transmitter of FIG. 1.
Figure 4C:
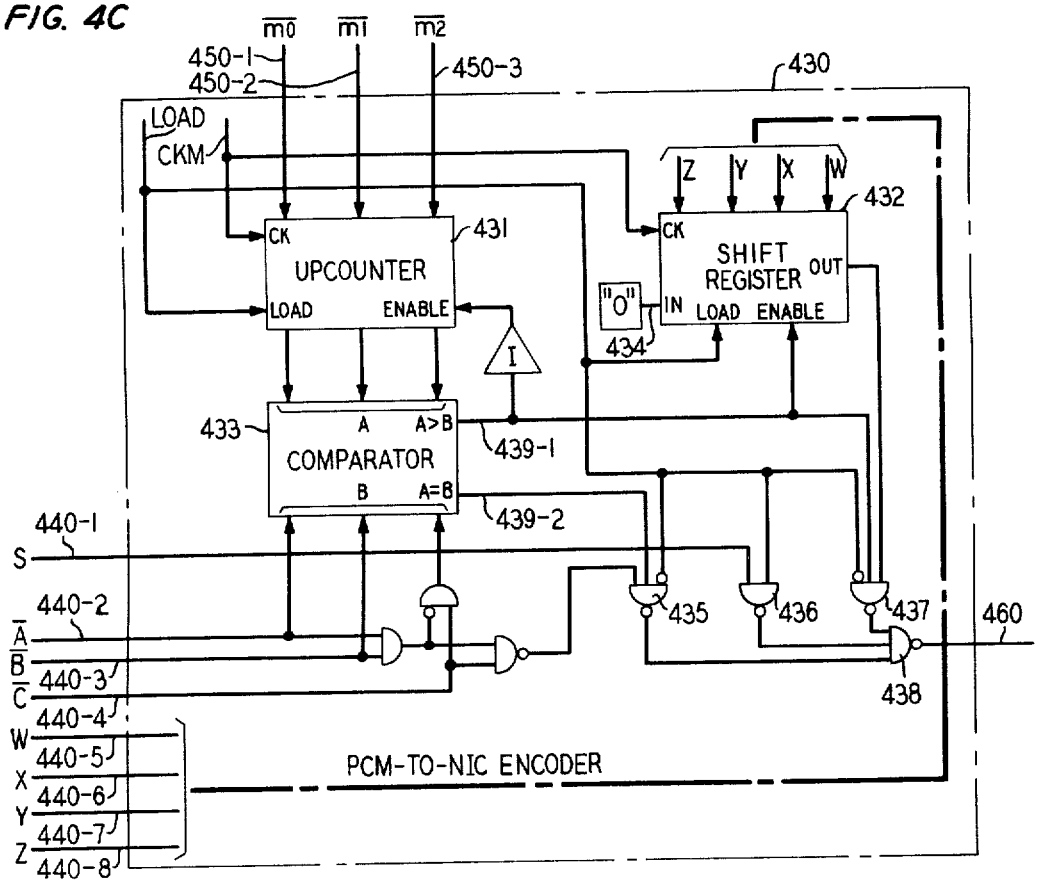
Figure 4B:
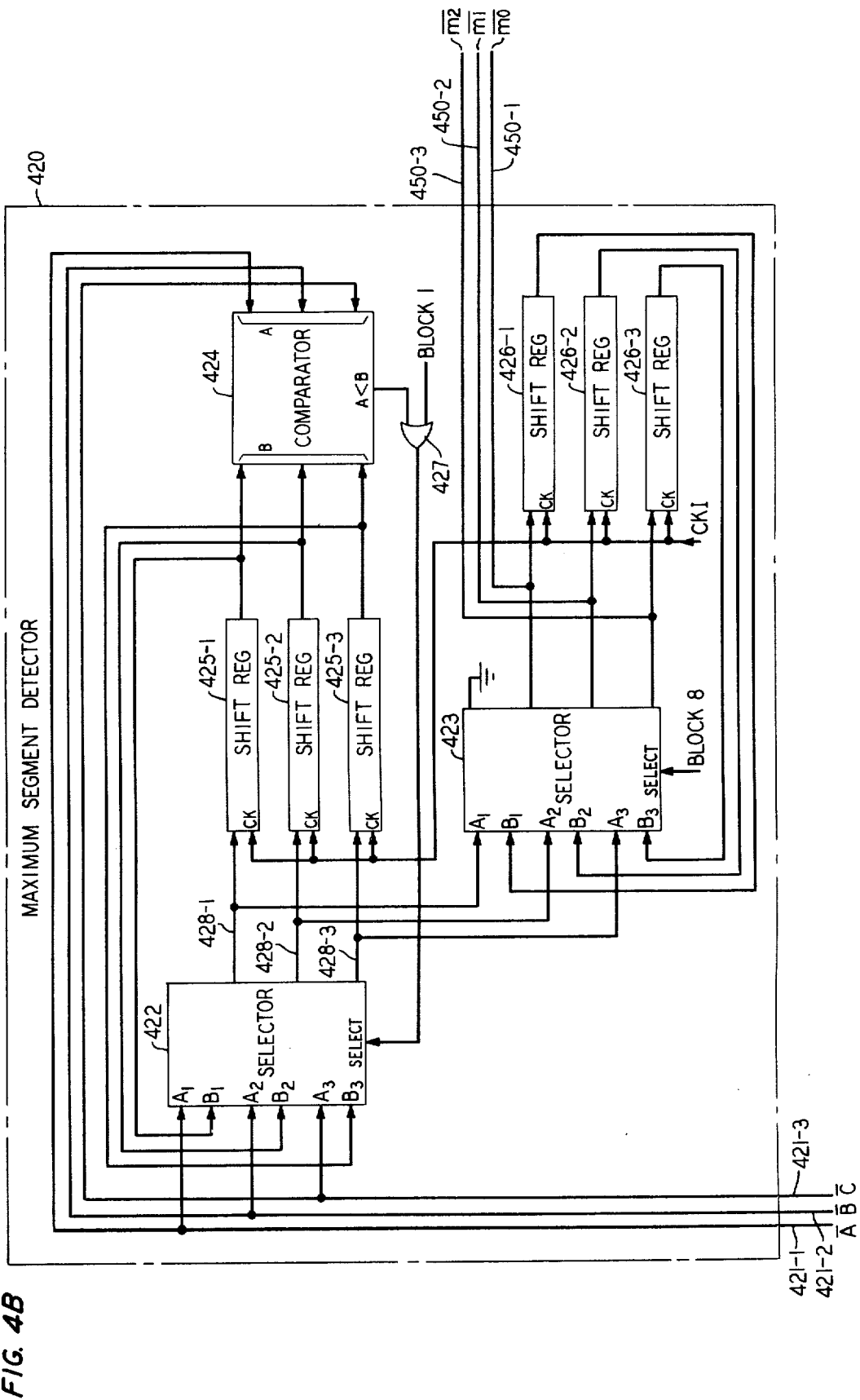

As to NIC converter 400, attention is directed concurrently to FIG. 1 and to FIGS. 4A through 4C. In FIG. 4A, frame delay store 410, which is functionally similar to the prior art digital delay store, includes a plurality of shift registers for storing in parallel a plurality of PCM characters. The number of PCM characters stored is illustratively one less than the number of PCM characters comprising a PCM block, thereby allowing a determination of the maximum segment value while the last PCM character to be NIC encoded in the block is being processed. A PCM, and hence NIC, block of eight characters is assumed. Accordingly, frame store 410 includes shift registers 411-1 through 411-8 for storing in parallel seven eight-bit characters from each of L × M (=192) trunks. Certainly, one embodiment could limit processing at this point to active trunks. However, in our illustrative embodiment a character is stored for each trunk, whether active or inactive. Hence, each shift register may be 1,344 bits in length. Also the storing in a shift register is responsive to clock signal CKI, extended to frame store 410 from timing circuit 800 over cable 870. Assuming a PCM character format of the form "SABCWXYZ," FIG. 4A illustrates frame delay store 410 as storing the sign bit in shift register 411-1; the complement of the character segment bits, labeled $\overline{A}$, $\overline{B}$ and $\overline{C}$ respectively, in shift registers 411-2 through 411-4; and the mantissa bits W, X, Y and Z respectively, in shift registers 411-5, 411,6, 411-7 and 411-8. The segment value complement is stored to simplify circuitry in illustrative PCM-to-NIC encoder 430, as later described.

Referring to FIG. 4B, maximum segment detector 420 includes apparatus, also responsive to clock signal CKI, for detecting and storing a three-bit maximum segment value for each of the L × M (=192) trunks, again whether active or inactive. Specifically, the segment value for each received PCM digital character is extended over leads 130-2 to 130-4 in FIG. 4A, through respective inverters, thence over leads 421-1 to 421-3 jointly to respective first inputs of selector 422 and comparator 424 in FIG. 4B. The first inputs of selector 422 are labeled $A_1$, $A_2$, and $A_3$ respectively. During the first character of a PCM block, a BLOCK1 logic one clock signal is extended through OR gate 427 to a select input of selector 422. On the one hand, in response to a logic one signal at the select input, signals at inputs $A_1$, $A_2$, and $A_3$ are extended through selector 422 to leads 428-1 through 428-3. On the other hand, in response to a logic zero signal at the select input, the signals at second inputs $B_1$, $B_2$, and $B_3$ of selector 422 are extended to leads 428-1 through 428-3 respectively. Leads 428-1 through 428-3 are in turn jointly connected to respective inputs of shift registers 425-1 through 425-3 and, respectively, to first inputs $A_1$, $A_2$, and $A_3$ of selector 423. Thus, since the BLOCK1 signal is a logic one during the first character of a block, the segment value for each first character of each PCM block on each of the L × M (=192) trunks is stored in parallel form in shift registers 425-1 through 425-3. During the second and subsequent characters in each PCM block the BLOCK1 signal is a logic zero. The segment value of each such subsequent character is compared by comparator 424 with a previous segment value for that trunk as stored in shift registers 425-1 through 425-3. In response to the detection of a new segment value for a trunk on leads 421-1 et seq exceeding a previous segment value for that trunk, as stored in shift registers 425-1 et seq, a logic one is extended from comparator 424 through OR gate 427 to the select input of selector 422. Responsive thereto, the new segment value at first inputs $A_1$, $A_2$, and $A_3$ is extended over respective leads 428-1 through 428-3 for storing in shift registers 425-1 through 425-3. The segment value thus extended is the then determined maximum segment value. That is, of the characters thus far compared the segment value so stored is the maximum. During the eighth character of the block, a BLOCK8 logic one clock signal is provided to the select input of selector 423; otherwise BLOCK8 signal is a logic zero. In response to a BLOCK8 logic one signal, the signal then appearing on leads 428-1 through 428-3 is the maximum segment value, all segment values in the block having been tested, and is accordingly selected by selector 423 and stored in shift registers 426-1 through 426-3. Hence, the maximum segment value is determined while the last PCM character is being processed for NIC encoding. Selection of the maximum segment value from shift registers 426-1 to 426-3 through the second inputs $B_1$, $B_2$, and $B_3$ of selector 423 is thereafter responsive to a logic zero BLOCK8 signal.

FIG. 4C illustrates PCM-to-NIC encoder 430 for converting an eight-bit PCM character, provided in parallel format on leads 440-1 through 440-8, to a serial eight-bit NIC character and extending the NIC character to lead 460. The 8/8 NIC encoding corresponds to the aforedescribed FIG. 2 character format as modified by truncating the four least significant bits of characters in columns two and three. For brevity, the operation of encoder 430 is described relative to an 8/8 NIC encoding of a PCM character having a segment value not equal to zero, i.e., ABC $\neq$ 0. The resultant NIC characters are related to the second column of FIG. 2. From that description, the operation of encoder 430 should be clear to one skilled in the art as to an 8/8 NIC encoding of a character having a zero segment value, i.e., ABC = 0. The latter NIC characters are related to the third column of FIG. 2.

Specifically, as to encoder 430, a LOAD clock signal extended thereto from timing circuit 800 over cable 870 is a logic one during the first bit of each PCM character and otherwise a logic zero. The LOAD signal is jointly provided to a load input of upcounter 431, to a load input of shift register 432, and to respective first inputs of NAND gates 435, 436 and 437. The sign bit S of the PCM character to be NIC encoded, also the first bit of that character, is extended over lead 440-1 to a second input of NAND gate 436 and, in response to a logic one LOAD signal, through NAND gates 436 and 438 onto lead 460. Also, in response to a logic one LOAD signal, mantissa bits WXYZ, extended over leads 440-5 through 440-8 to respective inputs of shift register 432, are loaded therein. The maximum segment value of the NIC block in complement form $\overline{M0}$, $\overline{M1}$, $\overline{M2}$ is provided by maximum segment detector 420, as previously described, over leads 450-1 through 450-3 to respective inputs of upcounter 431. Meanwhile, the segment value complement of each PCM character, provided on leads 440-2 through 440-4, is extended to respective B inputs of comparator 433. In response to a difference between the maximum segment value and the segment value of the PCM character to be NIC encoded, the difference being detected by comparator 433, a logic zero signal is provided over lead 439-1 through a second input of NAND gates 437 and 438 onto lead 460. Responsive to clock signal CKM, upcounter 431 simplifies the circuitry of encoder 430 by counting up from an initial value equaling the complement of the maximum segment value until the count equals the complement of the PCM character segment value. During the count operation, a logic zero is provided on lead 460 in accord with the translation illustrated in FIG. 2. Upon detection of equality between the maximum segment value and the character segment value, a logic one is extended over lead 439-2 through NAND gates 435 and 438 onto lead 460, thereby inserting a logic one preceding the mantissa bits. After detection of equality and responsive to a next CKM clock pulse, the equality is exceeded. As a result, a logic one is extended over lead 439-1 to an ENABLE input of shift register 432. Thereafter responsive to a CKM clock signal, the character mantissa bits are right shifted out of shift register 432 through NAND gates 437 and 438 onto lead 460 with appropriate logic zeros being appended thereto over lead 434. Thereby, each PCM character provided in parallel format at leads 440-1 through 440-8 undergoes an 8/8 NIC encoding, the encoded character being provided in serial form on lead 460.

Now turn to the buffering and priority rotation functions provided by maximum segment buffer 500 and NIC character buffer 600. In particular, it is remembered that a frame (FIG. 3B) in the output multiframe (FIG. 3C) usually includes a plurality of maximum segment values serially transmitted to the receiver before the plurality of interleaved bits of NIC characters from all active trunks. Remember also that there remain 366 bits in each frame to be partitioned between maximum segment values and NIC characters.

Figure 5:
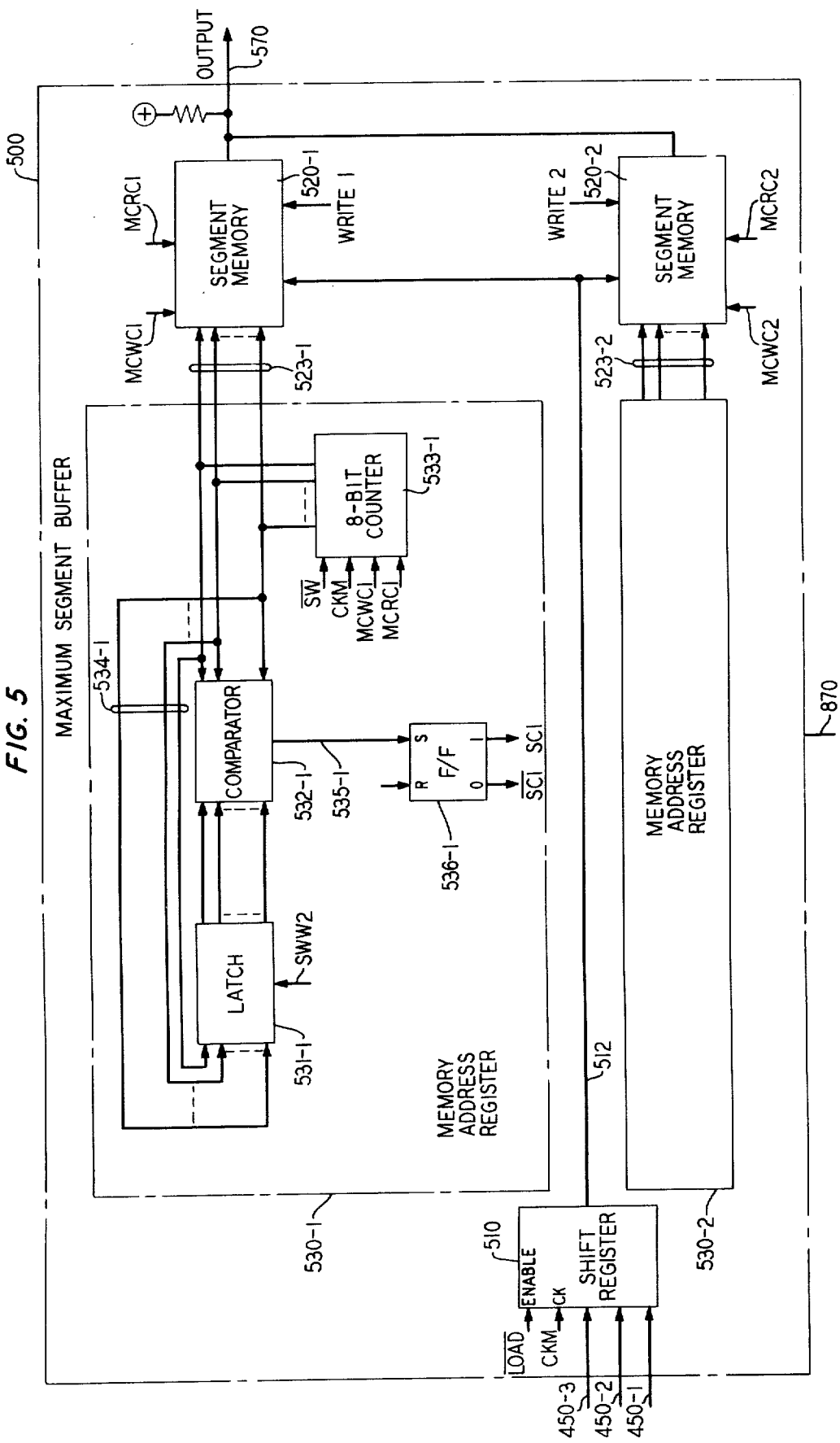
FIG. 5 illustrates a maximum segment buffer for use in the transmitter of FIG. 1.

As to maximum segment buffer 500, attention is directed to FIG. 5. The clock timing signals employed therein and derived therefrom are passed between buffer 500 and timing circuit 800 over cable 870. Broadly, illustrative maximum segment buffer 500 includes shift register 510 into which is parallel loaded, responsive to a $\overline{\text{LOAD}}$ clock signal, i.e., the complement of the LOAD signal, the maximum segment value provided on leads 450-1 through 450-3. Responsive to clock signal CKM, the maximum segment value is then serially shifted over lead 512 jointly to random access segment memories 520-1 and 520-2. However, the maximum value is selectively written into only one memory, the respective memory being selected responsive to a WRITE1 clock signal, or its complement, a WRITE2 clock signal. Thus, the illustrative embodiment of segment buffer 500 includes two segment memories. Advantageously, one memory is written usually with one or more maximum segment values for a first frame of the output multiframe while the second memory is read of one or more maximum segment values for a second frame. The read maximum segment values are thereafter transmitted to the receiver to be followed by the interleaved bits of the NIC characters from all active trunks. Further, since all characters detected on a trunk, whether the trunk is active or inactive, may be encoded by NIC converter 400, a maximum segment value extended through shift register 510 may be from an inactive trunk. Accordingly, responsive to a MCWC1 clock signal for memory 520-1 or a MCWC2 clock signal for memory 520-2, the timing clock signal being extended from maximum segment buffer clock generator 930 of timing circuit 800 over cable 870, only a maximum segment value for an active trunk is written in a memory. This obtains since the clock signal is related to an activity status signal ASV, the latter being extended from activity status register 700 over cable 780 to circuit 800.

The location in the memory into which the maximum segment value is written is determined by memory address registers 530-1 and 530-2, respectively for memories 520-1 and 520-2. Each memory address register, e.g., 530-1, includes a counter 533-1, a comparator 532-1, and a latch 531-1. Counter 533-1 is illustrated as an eight-bit counter for counting to at least 72, that count of 72 corresponding to three bits per maximum segment value for each of up to L (=24) active trunks. Thereby, when the maximum segment value for each of up to 24 active trunks has been written in a segment memory, the output of counter 533-1, representing the last written address in memory 520-1, is extended over cable 534-1 to latch 531-1 and stored therein responsive to a logic one SWW2 clock signal. Thereafter counter 533-1 is reset for reading memory 520-1. Maximum segment values are read from memory 520-1 for transmission over lead 570 responsive to read clock signal MCRC1. During a read cycle, i.e., the cycle during which a memory is being read, the address in latch 531-1 is compared by comparator 532-1 with the output of counter 533-1. Upon detection of a match, a signal is extended from comparator 532-1 over lead 535-1 to flip-flop 536-1 for providing a terminate clock signal SC1 to timing circuit 800 over cable 870. The maximum segment value for each active trunk has then been transmitted over lead 570 for insertion in a frame of the output multiframe. Thus, responsive to terminate signal SC1, bits of NIC characters written in character buffer 600 are interleaved and transmitted to the receiver. In accordance with the principles of our invention, during the interleaving, illustrative processor 200 is automatically adaptive to the nummber of active trunks to advantageously compress NIC characters to mitigate overload.

Figure 6:
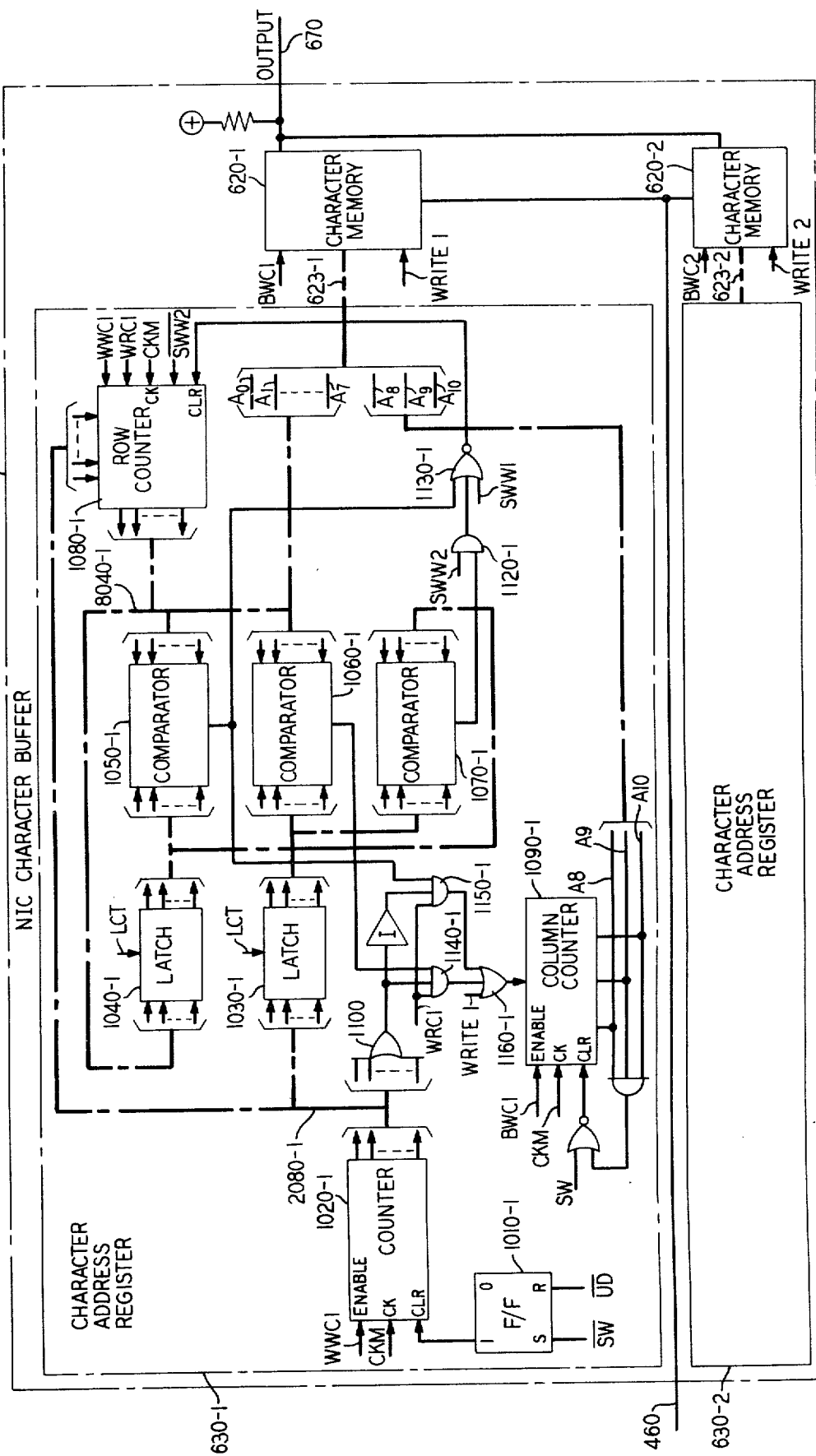
FIG. 6 illustrates a nearly instantaneous companding (NIC) block buffer for use in the transmitter of FIG. 1.

As to NIC character buffer 600, attention is directed to FIG. 6. Functionally, 8/8 NIC encoded characters are written into and read from a character memory of character buffer 600 to achieve the aforementioned priority rotation and interleaving of bits. Illustrative NIC character buffer 600 includes random access character memories 620-1 and 620-2 for buffering a NIC character from each active trunk. The characters are serially extended from NIC converter 400 over lead 460 jointly to the character memories for selective writing. Operationally, the two memories alternate in a fashion parallel to that of the aforementioned segment memories of segment buffer 500. That is, while one character memory is written for a first frame the other character memory is read for a second frame, the read characters being transmitted over output lead 670. The size of each character memory is assumed to be 2048 bits, sufficient to buffer an 8/8 NIC encoded character for each of up to 192 active trunks. The location in a memory into and from which the NIC characters are written and read is determined by character address registers 630-1 and 630-2, respectively, for memories 620-1 and 620-2. Each character address register, e.g., 630-1, includes a plurality of counters, comparators and latches.

Preceding a detailed description of a character address register, a brief overview of the functional considerations of an address register will make the detailed description more readily understood. For each trunk a NIC character is serially provided over lead 460 for writing in a memory. Unfortunately, a character may be provided from an inactive trunk. Accordingly, responsive to a BWC1 or a BWC2 clock signal provided over cable 870 from NIC character buffer clock generator 940 of timing circuit 800, NIC character buffer 600 is inhibited from writing characters for all but active trunks. For active trunks, the function of character address registers 630-1 and 630-2 may be described with the aid of matrix notation. Using that descriptive aid, let each NIC character be written in a row of a matrix. Clearly, since there can be up to 192 active trunks in a frame, the matrix may have 192 rows.

To achieve interleaving of bits, the illustrative embodiment of our automatically adaptive DSI arrangement transmits bits in the previously described predetermined order, not character-by-character as is done in the prior art. The interleaving of bits may be accomplished by transmitting the column bits of the matrix in the predetermined order. Here it is assumed that the NIC characters are written in consecutive rows of the matrix. Thus, for example, in output frame 4 of FIG. 3D, the character for trunk 25, if active, is written in the first row of the matrix while the character for trunk 26 is written in the second row, et cetera. The bit interleaving is attained by selectively reading the first column, into which have been written the sign bits. Accordingly, the bit in column one, row one may be first transmitted, followed by the bit in column one, row two et cetera. As an aside, it is observed that the bit interleaving need not commence with column one, row one but may commence with another column and/or another row. Such is a principle included in an illustrative embodiment of our priority rotation arrangement soon to be described. Advantageously, the interleaving terminates when all bits for all active trunks have been transmitted, or when all bits in the data field have been used, whichever event occurs first. Noteworthy, no precalculation of character size is made. Accordingly, no prior art arithmetic arrangement need be employed. Thereby, our improved overload mitigating arrangement is automatically adaptive to the number of active trunks and further is a less expensive mitigation arrangement, and preferable over the prior art.

To achieve priority rotation, the illustrative embodiment of our automatically adaptive DSI arrangement frame by frame selects a predetermined active trunk with which to commence bit interleaving. Clearly each character in memory 620-1 has a row address. Advantageously, priority rotation is accomplished by commencing the bit interleaving at a predetermined rotated row address, not necessarily with row one.

Returning to the apparatus in FIG. 6 and by way of outline, illustrative NIC character buffer 600, is described first in terms of a write cycle, i.e., the cycle during which a memory is being written, and then in terms of a read cycle. As to writing a NIC character, address register 630-1 and character memory 620-1 are selected responsive to a WRITE1 clock signal. The NIC character is written, responsive to a BWC1 clock signal, in memory 620-1 at a location provided over cable 623-1 by address register 630-1. The NIC character is later read and inserted in an output frame responsive to the complement of WRITE1, i.e., $\overline{\text{WRITE1}}$, which happens in our illustrative embodiment to be equivalent to a WRITE2 clock signal. For convenience, it is seen that the suffix 1 or 2 usually refers to apparatus and signals for controlling a combination address register/memory.

Each of the 2048 bits in a memory may be individually addressed by way of an 11-bit binary address. Conceptually the address may be treated as an eight-bit row address and a three-bit column address, the former provided by row counter 1080-1 and the latter by column counter 1090-1. Broadly, row counter 1080-1 extends row address $A_0 A_1 \ldots A_7$ over cable 623-1 to character memory 620-1 while column counter 1090-1 appends thereto the column address $A_8 A_9 A_{10}$.

Three-bit column counter 1090-1 is enabled, responsive to a logic one BWC1 clock signal, to count at a rate coincident with master clock signal CKM, the bit processing rate within processor 200. Hence the proper column address for each bit of the 8/8 NIC character is readily extended from an output of counter 1090-1 and appended to the row address.

Eight-bit row counter 1080-1 for providing the row address within memory 620-1 is cleared responsive to clock signal SWW1 extended to a CLR input thereof through NOR gate 1130-1. The clearing operation corresponds to an initialization of register 630-1 for writing. As a result, the write initialization address is usually that of the first row in the matrix. Thereafter and responsive to a logic one WWC1 clock signal, row counter 1080-1 is selectively incremented, i.e., is incremented if the trunk is active, for each NIC character extended over lead 460 and written into character memory 620-1. In addition to cable 623-1, the address output of row counter 1080-1 is extended over cable 8040-1 jointly to respective inputs of comparators 1050-1 and 1060-1 as well as to latch 1040-1.

As to latch 1040-1, the row counter output identifies the address of the storage location in memory 620-1 into which the "last" NIC character is written. Hence, for later reading and responsive to a logic one LCT clock signal, the address output of row counter 1080-1 is written into latch 1040-1. The LCT signal is provided by NIC character buffer clock generator 940 of timing circuit 800 upon detection of a coincidence of the aforementioned logic one LOAD and logic one activity status ASV clock signals. Thereby and at the end of a write cycle, latch 1040-1 contains the matrix row address for the memory location wherein is written the "last" NIC character.

Also during the write cycle and for use in priority rotation, the rotated row address of the first predetermined active trunk may be determined. Rotated row address determining apparatus in our illustrative embodiment includes the combination of flip-flop 1010-1 responsive to complemented clock signals $\overline{SW}$ and $\overline{UD}$ and counter 1020-1 responsive to clock signals CKM and WWC1. The row address output of counter 1020-1 is extended over lead 2080-1 jointly to latch 1030-1, where the address is written responsive to a logic one LCT signal, and to row counter 1080-1 for reading initialization.

At the end of the write cycle, the WRITE1 clock signal becomes a logic zero. Responsive thereto, address register 630-1 and character memory 620-1 are operational for reading character memory 620-1 and for interleaving bits of NIC characters and transmitting same over output lead 670 to the receiver. As previously mentioned, terminate clock signal SC1 is extended from maximum segment buffer 500 over lead 870 to timing circuit 800 as an indicaton that the maximum segment values in the frame have been read. Hence a NIC character can be read. Terminate signal SC1 is processed through timing circuit NIC character buffer clock generator 960 to provide a logic one WRC1 clock signal for controlling address register 630-1 during the read cycle. Row counter 1080-1 and latch 1030-1 are initialized for reading with the output address of counter 1020-1. It is by way of the read initialization of counter 1080-1 that our improved priority rotation arrangement is included in the illustrative embodiment. After read initialization, row counter 1080-1 contains the row address within memory 620-1 for the first NIC character to be read for transmission in the frame. Now as to the bit interleaving, the first bit of the first character is read and transmitted, the address having been extended over cable 623-1 to memory 620-1. The output of counter 1080-1 is then compared by comparator 1050-1 with the address in latch 1040-1. Absent equality, counter 1080-1 is incremented for reading the first bit of the character for the next active trunk. Recall that the next bit to be read and transmitted is from the next row. Upon detection of equality by comparator 1050-1, a logic one signal is extended therefrom through NOR gate 1130-1 and thence to the CLR input of row counter 1080-1. Hence, a "wrap-around" occurs so that the output of row counter 1080-1 is reset to the address of the first written character. The reading continues until either all first bits have been transmitted or until all bits in the data field have been used. The detection of all first bits having been transmitted obtains as follows. Responsive to a logic one LCT signal, latch 1030-1 is initialized with the row address of the NIC character for the first predetermined active trunk. In the normal course of events, after "wrap-around" row counter 1080-1 will eventually again contain the read initialized address, and, but for, the combination of latch 1030-1 and comparator 1060-1 our DSI arrangement would again transmit all first bits. However, latch 1030-1 contains the first read character address. The contents of latch 1030-1 is compared by comparator 1060-1 with the output of row counter 1080-1. Responsive to an equality signal provided by comparator 1060-1 through AND gate 1140-1 and OR gate 1160-1, column counter 1090-1 is incremented. Recall that three-bit column counter 1090-1 identifies the matrix column, the row address of which is given by row counter 1080-1. Accordingly, the combination of row counter 1080-1 and column counter 1090-1 is initialized for reading the second bit of each character until all second bits have been transmitted or until all bits in the data field have been used. The reading and interleaving process continues until all bits are transmitted or until all bits in the data field have been used, whichever event occurs first.

Figure 8A:
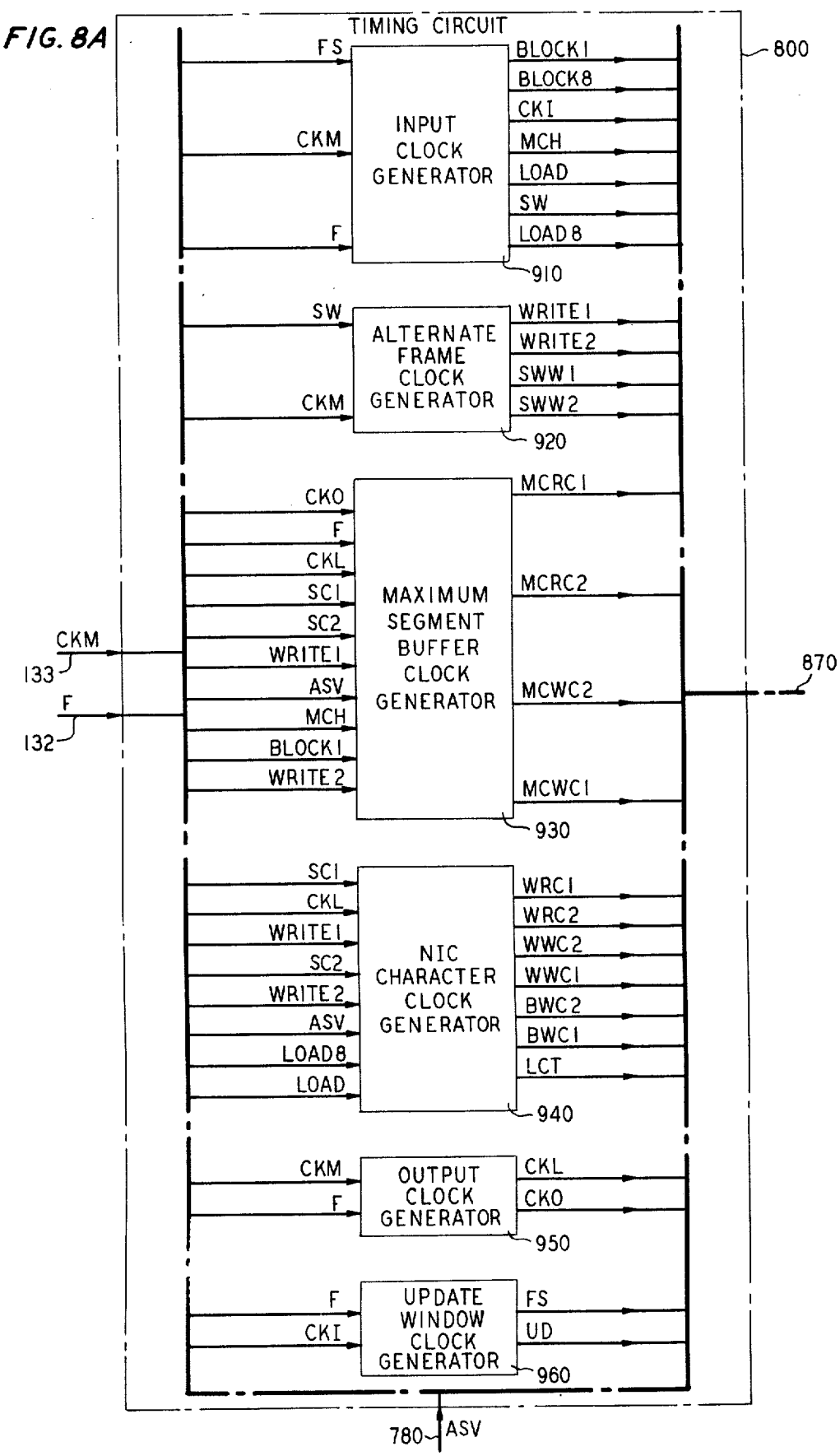
FIG. 8A illustrates in block diagram form a timing circuit for use in the transmitter of FIG. 1.
Figure 8B:
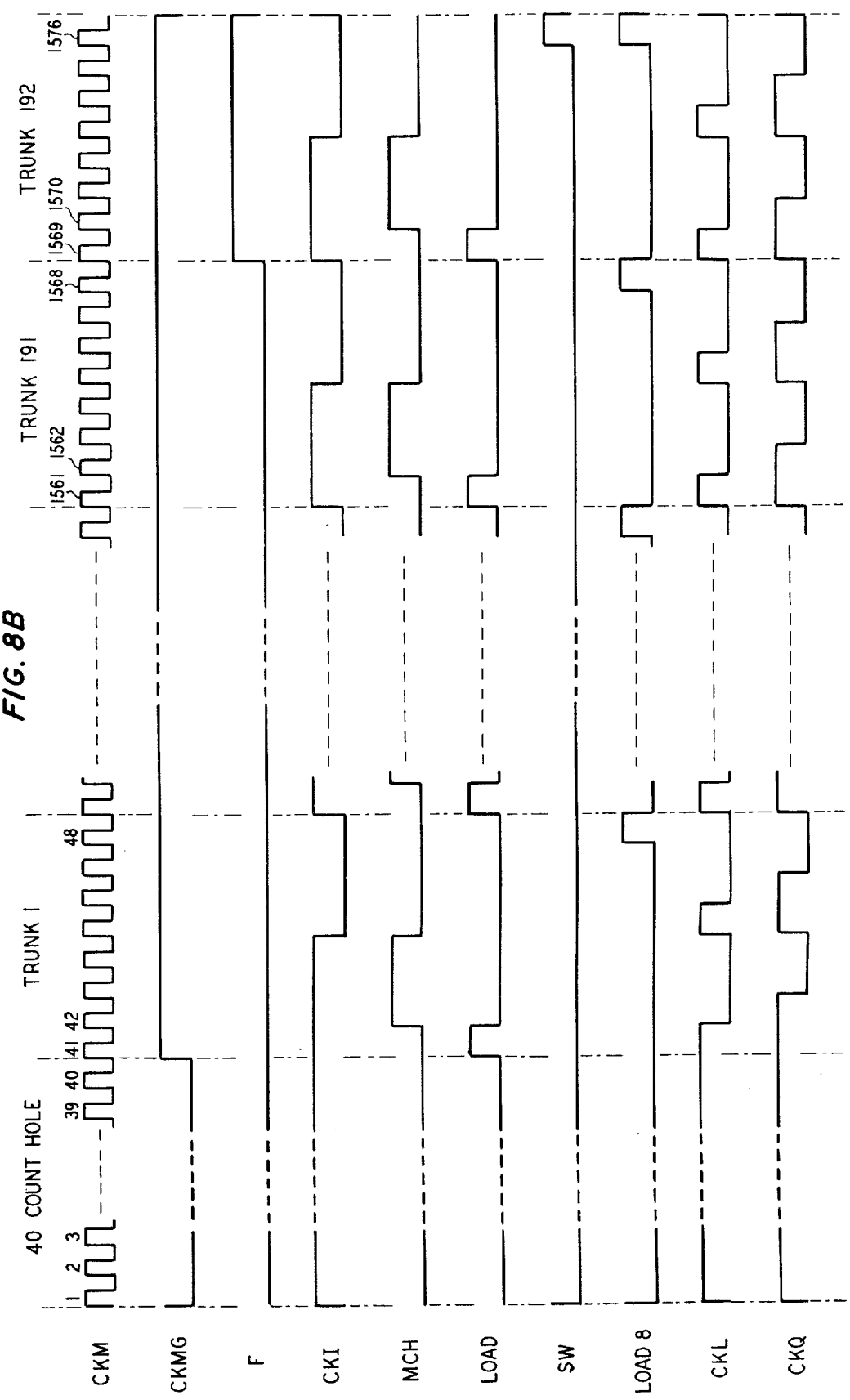
FIG. 8B illustrates a plurality of clock timing signals usable in the illustrative transmitter of FIG. 1.

The plurality of timing clock signals, employed within DSI data processor 200 and provided by timing circuit 800, are identified on respective leads of cable 870 in block diagram FIG. 8A. As background for a detailed description of timing circuit 800, the timing signals are responsive to three basic signals extended to DSI data processor 200 from input multiplexer/detector 120. Some of the signals are illustrated in the timing diagram of FIG. 8B.

Figure 9A:
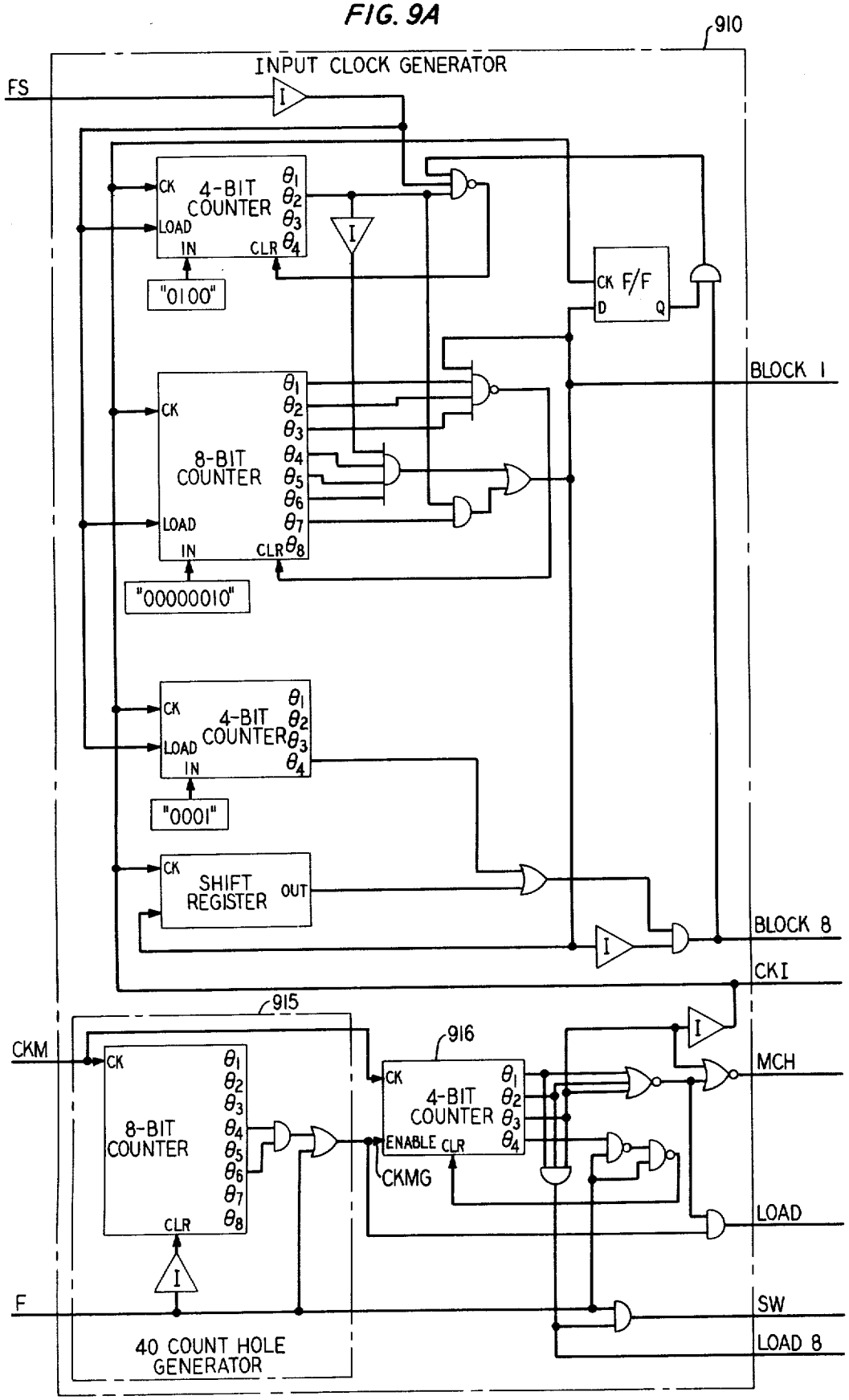
FIGS. 9A through 9F schematically illustrate details of the plurality of block diagram clock generators shown in FIG. 8A.
Figure 9B:
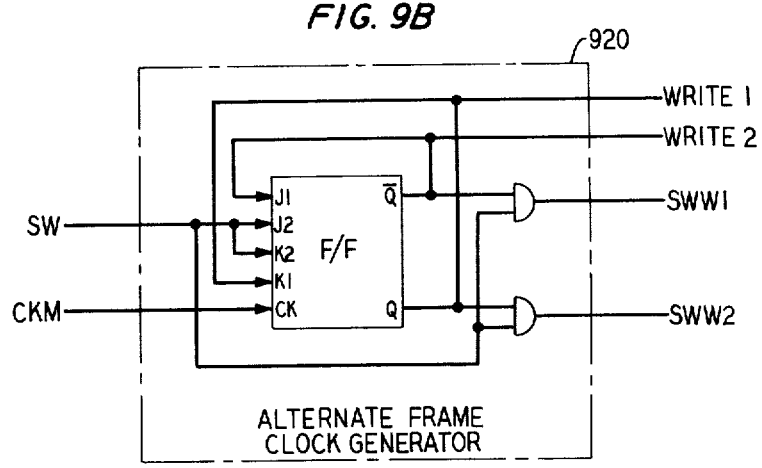
Figure 9C:
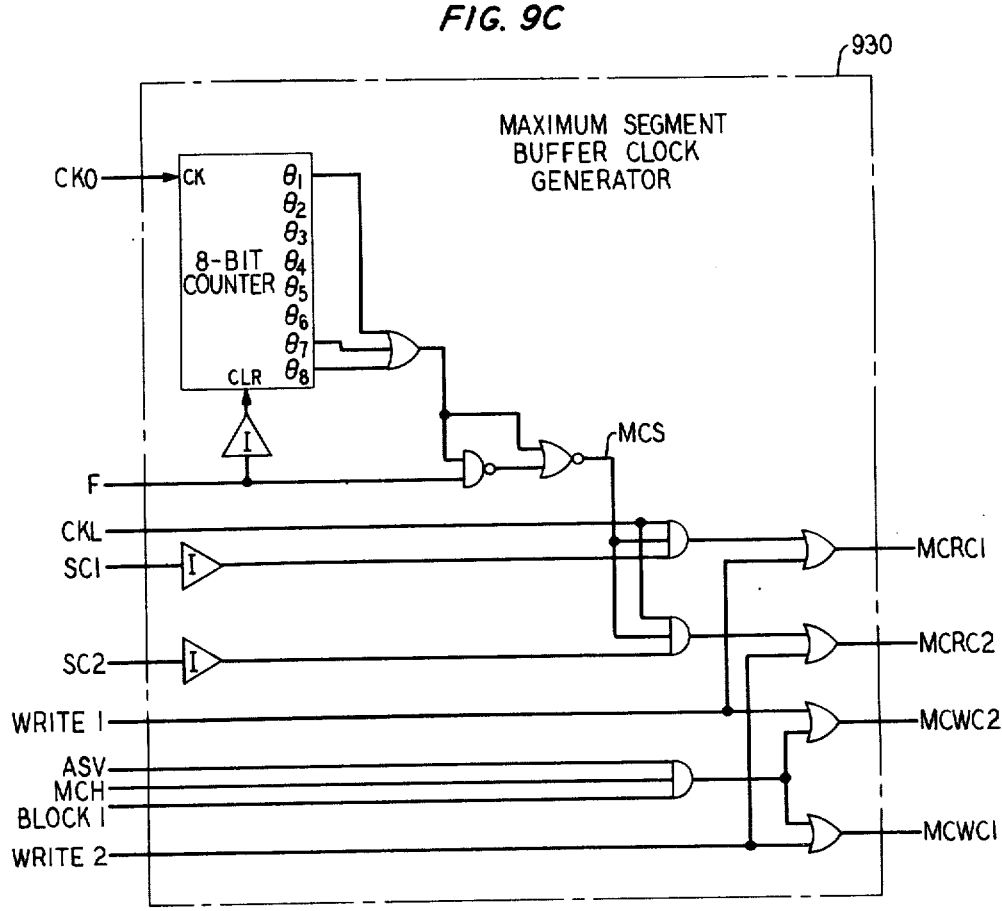
Figure 9D:
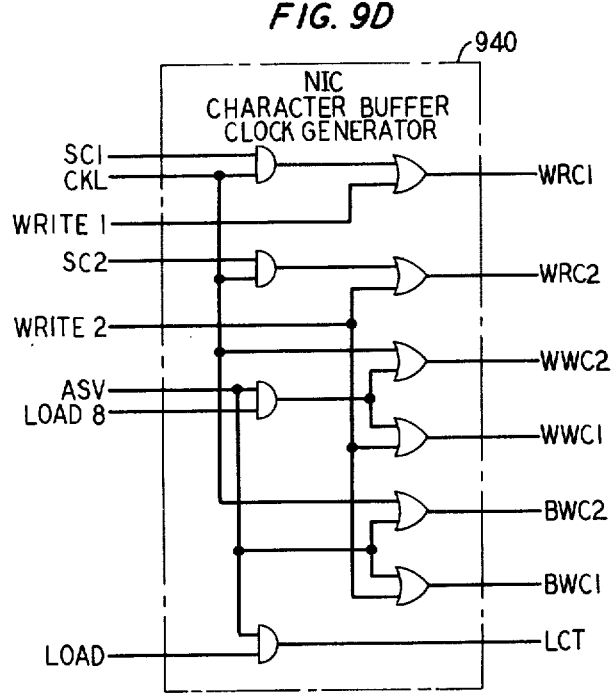

A first basic signal, called master clock signal CKM, is extended to timing circuit 800 over lead 133. The illustrative CKM signal is provided at a nominal clock pulse rate of 12.608 MHz, i.e., the bit processing rate within processor 200. Since each illustrative 193-bit input frame arrives at a nominal bit rate of 1.544 Mb/s, the time period for the M (=8) input frames to arrive in synchronism at and be processed by transmitter 100 is about 125 microseconds. By a straightforward algebra, it is clear that master clock signal CKM can provide 1576 clock pulses during the 125 microsecond time period. However, since each input digital character is eight bits in length and since there are 192 trunks, only 1536 pulses are usually required during the time period. The difference, represented by a clock pulse count of 40, is identified in FIG. 8B as a "40 count hole." In the illustrative embodiment, inhibiting clock signal CKMG, provided hole count generator 915 (FIG. 9A) of timing circuit 800, corresponds to the difference. Clock signal CKMG is a logic zero during the clock pulse hole count of 40 and otherwise is a logic one signal. Responsive to a CKMG signal, apparatus within DSI data processor 200 can be inhibited during the hole count of 40.

A second basic signal, called framing signal F, is extended to timing circuit 800 over lead 132. Illustratively, framing signal F for indicating framing among a plurality of 125 microsecond time periods is a logic zero during CKM clock pulse counts 1 through 1568 and a logic one during clock pulse counts 1569 through 1576 of each of the 125 microsecond time periods. The logic one occurs during the processing of the digital character from trunk 192 for indicating framing.

Figure 9E:
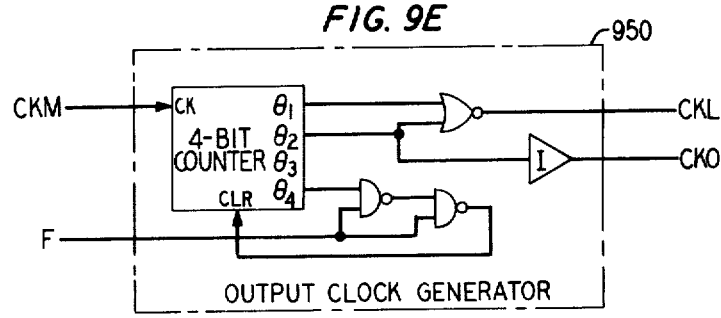
Figure 9F:
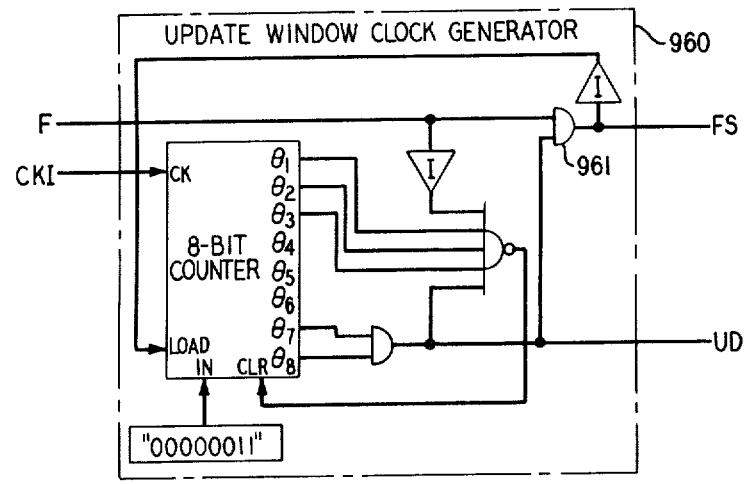

A third basic signal, called the trunk activity signal, is extended from multiplexer/detector 120 over lead 131 to activity status register 700, an illustrative shift register embodiment of which is shown in FIG. 7A. Activity status register 700 includes NAND gates 710, 720 and 730; inverter 740; and 192-bit, i.e, one bit for storing the trunk activity signal for each of L × M trunks, shift register 750. Other status information may be stored elsewhere in the transmitter Register 700 apparatus is advantageously arranged in FIG. 7A so that an old status signal in shift register 750 can be selectively compared through the NAND gates under control of window clock signal UD. Responsive thereto an output of NAND gate 730 is a new status signal ASV for storage in the shift register. The selective comparison is for obviating the previously mentioned potential discrepancy in the activity status of a trunk. To refresh the recollection as to that discrepancy problem, the activity status of the first predetermined group of M (=8) trunks, e.g., column two of FIG. 3D, is updated during a frame. However, any of a second predetermined group of L (=24) trunks, e.g., column three of FIG. 3D, may have a change in activity status during the frame. Hence, the potential discrepancy problem. Our illustrative priority rotation arrangement takes care that a character from a trunk is not transmitted on a channel prior to the receiver being signaled that the trunk is active. That potential discrepancy obviating arrangement includes the illustrated NAND gate structure whereby shift register 750 is updated only responsive to a combination logic one trunk activity signal and a logic one UD clock signal. Specifically, the trunk activity signal is provided over lead 131 to a first input of NAND gate 710. The UD clock signal, extended over cable 870 from update window clock generator 760 (FIG. 9F) in timing circuit 800, is provided to a second input of NAND gate 710 and through inverter 740 to a first input of NAND gate 720. Responsive to clock signal CKI, which includes a clock pulse per trunk, the old activity signal is shifted from shift register 750 to a second input of NAND gate 720. An output of each of gates 710 and 720 is extended to a respective first l and second input of NAND gate 730. The operation of the just described structure is summarized by way of the truth table illustrated in FIG. 7B. Noteworthy, the selective comparison between the trunk activity signal provided on lead 131 and the old ASV signal stored in shift register 750 is responsive to sliding window signal UD for selectively inhibiting a change in activity status during a frame. In particular, the new ASV signal extended over lead 780 equals the old ASV signal when clock signal UD is a logic zero and equals the trunk signal on lead 131 when signal UD is a logic one. Thereby, the selectivity advantageously updates only trunks in the first predetermined group of M trunks. Hence, the discrepancy problem is advantageously obviated.

Turning now to a description of illustrative timing circuit 800, timing clock signals, labeled on respective leads in FIG. 8A, are extended over cable 870 between a plurality of apparatus within data processor 200. Broadly, timing circuit 800 includes input clock generator 910 to provide clock signals including signal CKI for processing input characters through NIC converter 400. Output clock generator 950 provides clock signals including signals CKO and CKL for processing the NIC encoded characters respectively through maximum segment buffer 500 and NIC character buffer 600. Further, alternate frame clock generator 920 provides clock signals including WRITE1 and its complement WRITE2 for alternating apparatus within buffers 500 and 600 between the aforedescribed read and write cycles. In turn the buffers are controlled during the read and write cycles responsive to clock signals from maximum segment buffer clock generator 930 and NIC character buffer clock generator 940. In addition, update window clock generator 960 provides clock signals including window signal UD for selectively signaling the activity status of the aforementioned first predetermined group of M trunks during an output frame. A specific implementation of the clock generator apparatus illustrated in block diagram form in FIG. 8A is depicted schematically in FIGS. 9A through 9F, by way of example. In each of the schematic diagrams the plurality of clock signals are labeled on respective leads. In most instances, to avoid unnecessary cluttering of the figures, the inverters for complementing the various signals have been omitted from the schematics. Exemplary of the clock apparatus is illustrative input clock generator 910 of FIG. 9A with its input clock signals FS, CKM and F and its output of signals BLOCK1, BLOCK8, CKI, MCH, LOAD, SW and LOAD8. Clock signals BLOCK1 and BLOCK8 have previously been described. Except for clock signal FS, the relative timing of the remainder of the input and output clock signals of input clock generator 910 is illustrated in a timing diagram FIG. 8B. Also illustrated there are clock signals CKL and CKO, which are provided by output clock generator 950 of FIG. 9E. Clock signal FS is provided by update window clock generator 960 in FIG. 9F as an output of its AND gate 961. Two inputs to AND gate 961 are respectively framing signal F and previously described sliding window signal UD.

As is well known in the digital art, an exemplary timing diagram illustrating the relative timing relationship among a plurality of clock pulses, such as is illustrated in FIG. 8B, can be implemented by relatively straightforward operational apparatus using standard gates, counters, shift registers and other logic apparatus. Such is the case in implementing the clock signals in FIG. 8B, for example, via clock generators 910 and 950 as illustrated respectively in FIGS. 9A and 9E. Conversely, using a schematic including common logic symbols such as is illustrated in the clock generators of FIGS. 9B, 9C, 9D and 9F, and having the relative timing of input clock signals, it is a relatively simple matter to construct a timing diagram showing the timing relationship of the output clock signals of those generators. Accordingly, the detailed description of illustrative timing circuit 800 is limited to a discussion of only certain of the timing signals illustrated in FIG. 8B, certain other signals having already been described. Specifically, signal CKI includes a logic one signal responsive to a logic zero inhibiting signal CKMG. Otherwise, responsive to signal CKM, signal CKI includes a transition from logic one to logic zero for each of the L × M (=192) trunks. Here generator 910 is arranged to provide a logic one CKI for a first count of four CKM pulses, followed by a logic zero responsive to a second and next count of four CKM pulses. Stated alternatively, except for the 40 count hole, signal CKI divides clock signal CKM by eight. Similarly, clock signal CKO divides clock signal CKM by four. Still further, clock signal LOAD is a logic one during the first bit of each character from a trunk, otherwise clock signal LOAD is a logic zero. Also, clock signal LOAD8 is a logic one during bit eight of each character from a trunk and otherwise a logic zero.

Although the invention has been described and illustrated in detail with respect to a DSI data transmitter, it is to be understood that the same is not by way of limitation. For example, the principles of our invention apply equaly to a DSI data receiver for reconstructing the compressed data characters from each channel and extending same to a respective trunk. The spirit and scope of our invention is limited only by the terms of the appended claims.

We claim:

1. In a digital communication system for communicating digitized message samples between a transmitting station and a receiving station over a first plurality of trunks through a second plurality of channels; said system including activity status means for determining whether each trunk is active or inactive; buffer means for forming multibit output frames, each frame including an activity status field and a data field; and overload mitigating means operative upon said digitized message samples; and characterized in that said system further comprises:

means for applying nearly instantaneous companding to said digitized message samples to form second digitized message samples; and means responsive to said buffer means and to said applying means for forming a multiframe, said multiframe including a plurality of frames, each frame including predetermined ones of said second digitized message samples in said data field thereof.

2. The system defined in claim 1 wherein said buffer means includes means for interleaving bits of different ones of said second digitized message samples.

3. The system defined in claim 1 further comprising: means responsive to said activity status means for automatically and adaptively compressing said second digitized message samples.

4. The system defined in claim 3 wherein said automatically adaptive means includes means operative during a frame for interleaving in a predetermined order bits of different ones of said second digitized message sampls until all bits of said second digitized samples have been included in said data field of said frame.

5. The system defined in claim 3 wherein said automatically adaptive means includes means operative upon detection of overload for interleaving bits of different ones of said second digitized message samples until all bits of said data field of at least one of said frames have been used.

6. The system defined in claim 3 wherein said compressing means includes means for selectively truncating at least one predetermined bit of at least one of said second digitized message samples when all bits of said data field of said frame have been used.

7. The system defined in claim 1 further comprising means for providing a predetermined trunk priority rotation in said multiframe.

8. The system defined in claim 7 wherein said priority rotation providing means includes said activity status field of each of said frames including a trunk activity signal for each of a first predetermined group of trunks.

9. The system defined in claim 8 wherein said priority rotation providing means further includes means responsive to said activity status for inserting said second digitized message samples in said data field in a predetermined order whereby a signal degradation is approximately uniform among all trunks.

10. The system defined in claim 8 wherein said priority rotation providing means includes means for obviating a discrepancy in signaling said trunk activity, said obviating means including means for inhibiting a change in trunk activity status for a trunk unless said trunk is also included in said first predetermined group of trunks.

11. The system defined in claim 7 wherein said priority rotation providing means includes said data field of each of said frames including a maximum segment value for each active trunk of a second predetermined group of trunks.

12. The system defined in claim 7 wherein said priority rotation providing means includes said data field of each of said frames including at least one bit of at least one of said second digitized message samples for each active trunk.

* * * * *